(12) United States Patent
Mathews et al.

(10) Patent No.: US 12,223,952 B2
(45) Date of Patent: Feb. 11, 2025

(54) GENERATION AND UTILIZATION OF PSEUDO-CORRECTION(S) TO PREVENT FORGETTING OF PERSONALIZED ON-DEVICE AUTOMATIC SPEECH RECOGNITION (ASR) MODEL(S)

(71) Applicant: GOOGLE LLC, Mountain View, CA (US)

(72) Inventors: Rajiv Mathews, Sunnyvale, CA (US); Dragan Zivkovic, Sunnyvale, CA (US); Khe Chai Sim, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 300 days.

(21) Appl. No.: 17/959,637

(22) Filed: Oct. 4, 2022

(65) Prior Publication Data
US 2024/0112672 A1 Apr. 4, 2024

(51) Int. Cl.
*G10L 15/00* (2013.01)
*G10L 15/06* (2013.01)
(Continued)

(52) U.S. Cl.
CPC ............ *G10L 15/19* (2013.01); *G10L 15/063* (2013.01); *G10L 15/22* (2013.01); *G10L 15/30* (2013.01); *G10L 2015/0635* (2013.01)

(58) Field of Classification Search
None
See application file for complete search history.

(56) References Cited

U.S. PATENT DOCUMENTS 9,703,892 B2 7/2017 Ramer et al.
10,152,298 B1 12/2018 Salvador
(Continued)

FOREIGN PATENT DOCUMENTS

CN 114360549 A 4/2022
EP 3389045 10/2018
(Continued)

OTHER PUBLICATIONS

European Patent Office; International Search Report and Written Opinion issued in Application No. PCT/US2023/027141; 21 pages; dated Oct. 13, 2023.
(Continued)

*Primary Examiner* — Satwant K Singh
(74) *Attorney, Agent, or Firm* — Gray Ice Higdon

(57) ABSTRACT

On-device processor(s) of a client device may store, in on-device storage and in association with a time to live (TTL) in the on-device storage, a correction directed to ASR processing of audio data. The correction may include a portion of a given speech hypothesis that was modified to an alternate speech hypothesis. Further, the on-device processor(s) may cause an on-device ASR model to be personalized based on the correction. Moreover, and based on additional ASR processing of additional audio data, the on-device processor(s) may store, in the on-device storage and in association with an additional TTL in the on-device storage, a pseudo-correction directed to the additional ASR processing. Accordingly, the on-device processor(s) may cause the on-device ASR model to be personalized based on the pseudo-correction to prevent forgetting by the on-device ASR model.

20 Claims, 7 Drawing Sheets

(51) Int. Cl.
*G10L 15/19* (2013.01)
*G10L 15/22* (2006.01)
*G10L 15/30* (2013.01)

(56) References Cited

U.S. PATENT DOCUMENTS

| | | | |
|---|---|---|---|
| 10,325,596 B1 | 6/2019 | Tran et al. | |
| 10,335,572 B1 | 7/2019 | Kumar | |
| 10,388,272 B1 | 8/2019 | Thomson et al. | |
| 2012/0150532 A1 | 6/2012 | Mirowski et al. | |
| 2012/0277893 A1 | 11/2012 | Davis et al. | |
| 2013/0080164 A1 | 3/2013 | Zanolin et al. | |
| 2014/0365226 A1 | 12/2014 | Sinha | |
| 2015/0127346 A1 | 5/2015 | Gruenstein et al. | |
| 2016/0267380 A1 | 9/2016 | Gemello et al. | |
| 2017/0312614 A1 | 11/2017 | Tran et al. | |
| 2018/0122365 A1* | 5/2018 | Kunitake | G10L 15/02 |
| 2018/0232662 A1 | 8/2018 | Solomon et al. | |
| 2019/0115026 A1 | 4/2019 | Sharifi | |
| 2019/0304459 A1 | 10/2019 | Howard et al. | |
| 2019/0339784 A1 | 11/2019 | Lemay et al. | |
| 2020/0057287 A1 | 2/2020 | Tsakalakos et al. | |
| 2021/0074286 A1* | 3/2021 | Cotting | G06F 3/165 |
| 2021/0327410 A1* | 10/2021 | Beaufays | G10L 15/22 |
| 2022/0115000 A1* | 4/2022 | Beaufays | G10L 13/047 |
| 2022/0122589 A1* | 4/2022 | Sharifi | G10L 15/22 |

FOREIGN PATENT DOCUMENTS

| | | |
|---|---|---|
| WO | 2018184214 | 10/2018 |
| WO | 2018212941 | 11/2018 |
| WO | 2019212567 | 11/2019 |

OTHER PUBLICATIONS

Brownlee; A Gentle Introduction to Exploding Gradients in Neural Networks; XPO55813789; Retrieved from the Internet: https://web.archive.org/web/20180709092622/https://machinelearningmastery.com/exploding-gradients-in-neural-networks/; dated Dec. 8, 2017.
Brownlee; How to Implement the Backpropagation Algorithm from Scratch in Python; XP055813704; Retrieved from the Internet; https://web.archive.org/web/2019062005443/https://machinelearningmastery.com/implement-backpropagation-algorithm-scratch-python/; dated Nov. 7, 2016.

\* cited by examiner

GENERATION AND UTILIZATION OF PSEUDO-CORRECTION(S) TO PREVENT FORGETTING OF PERSONALIZED ON-DEVICE AUTOMATIC SPEECH RECOGNITION (ASR) MODEL(S)

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using an automatic speech recognition (ASR) model) on a spoken utterance to generate corresponding text, perform a semantic analysis of the text in an attempt to determine the meaning of the spoken utterance, and undertake one or more actions based on the determined meaning.

While speech recognition performance has continued to improve, inaccurate speech recognition can still occur for many situations. Further, inaccurate speech recognition can be exacerbated when speech recognition is performed on-device (i.e., locally at a client device). This can be due to, for example, an on-device ASR model being less robust than a cloud-based, global ASR model, on-device memory and/or processor resources being more constrained than cloud-based resources, and/or word lexicons being more constrained on-device. However, in many circumstances it would be beneficial to perform speech recognition on-device rather than remotely in light of technical considerations that may include performance, data security and network usage.

Some techniques have been proposed to identify and correct inaccurate speech recognition locally at client devices. For example, some techniques may monitor user interactions with a transcription that includes recognized text generated based on processing audio data that captures a spoken utterance of a user. In this example, the user interactions may modify a portion of the text to alternate text, and this modification may be considered a correction for inaccurate speech recognition. Further, the on-device ASR model may be updated based on the correction to mitigate future occurrences of inaccurate speech recognition for the spoken utterance of a user. However, these techniques can consume an unnecessary quantity of memory of the client devices (e.g., by caching these corrections over an elongated duration of time) and/or can inadvertently forget the correction over time due to various other considerations (e.g., wipeout compliance mandates and/or other considerations). As a result, there is a need in the art for improved techniques to mitigate inaccurate speech recognition that is performed on-device.

SUMMARY

Implementations described herein are directed to generation and utilization of pseudo-correction(s) to prevent forgetting of personalized on-device automatic speech recognition (ASR) model(s). For example, on-device processor(s) of a client device may receive audio data that captures a spoken utterance of a user of the client device, process, using an on-device ASR model that is stored locally in on-device storage of the client device, the audio data to generate a plurality of speech hypotheses that are each predicted to correspond to the spoken utterance, and cause a given speech hypothesis, from among the plurality of speech hypotheses, to be visually rendered for presentation to the user at a display of the client device. For instance, assume that a user of the client device provides a spoken utterance of "Tell Khe Chai that I will miss the meeting". In this instance, microphone(s) of the client device may generate the audio data that captures the spoken utterance, and the audio data may be processed using the on-device ASR model to generate a plurality of speech hypotheses for the spoken utterance, such as "Tell keychain that I will miss the meeting", "Tell key why that I will miss the meeting", "Tell mai tai that I will miss the meeting", and so on. Further assume that the given speech hypothesis of "Tell keychain that I will miss the meeting" is visually rendered for presentation to the user at a display of the client device as being predicted to correspond to the spoken utterance (e.g., based on values associated with each of the plurality of speech hypotheses and/or term(s) of each of the plurality of speech hypotheses). However, the given speech hypothesis of "Tell keychain that I will miss the meeting" includes an ASR misrecognition (e.g., "keychain" instead of "Khe Chai" as the user intended in providing the spoken utterance).

Accordingly, the on-device processor(s) may receive, responsive to the given speech hypothesis being visually rendered for presentation to the user, further user interface input that modifies at least a portion of the given speech hypothesis to an alternate speech hypothesis. For instance, the user may direct touch input to the display of the client device to modify "keychain" to "Khe Chai" or provide an additional spoken utterance that instructs the client device to modify "keychain" to "Khe Chai". Further, the on-device processor(s) may store, in the on-device storage of the client device, at least the portion of the given speech hypothesis (e.g., "keychain") and the alternate speech hypothesis (e.g., "Khe Chai") as a correction for the on-device ASR model, and optionally in association with the audio data that captures the spoken utterance. Moreover, the on-device processor(s) may cause the on-device ASR model to be updated based on at least the correction. As a result, the on-device ASR model may be more robust with respect to correctly recognizing future occurrences of "Khe Chai" in future spoken utterances, thereby preventing and/or mitigating ASR misrecognitions for these future spoken utterances.

Notably, the on-device ASR model may be periodically updated based on corrections and/or other data stored in a training cache of the on-device storage of the client device to personalize the on-device ASR model to the user of the client device. However, the corrections and/or the other data may be periodically discarded from the training cache for various reasons (e.g., due to data minimization principles, due to compliance mandates, and/or due to other considerations). Put another way, the corrections and/or the other data may each be stored in association with a corresponding time to live (TTL) in the on-device storage of the client device, such that the corrections and/or the other data may be purged from the training cache of the on-device storage of the client device when the corresponding TTL lapses. Further, in the above instance and prior to the corresponding TTL associated with the corrections and/or the other data lapsing, it is unlikely that the user would provide any of the same corrections since the on-device ASR model is more robust with respect to correctly recognizing the future occurrences of "Khe Chai" in the future spoken utterances. Accordingly, in the above instance, when the corresponding TTL associated with the correction does lapse, the on-device ASR model may be susceptible to incorrectly recognizing future occurrences of "Khe Chai" in future spoken utterances until the user provides another correction. Thus, the on-device processor(s) may generate and utilize one or more pseudo-corrections that correspond to the correction to minimize the susceptibility of incorrectly recognizing future occurrences of "Khe Chai" in future spoken utterances.

For example, and prior to the corresponding TTL associated with the correction lapsing, the on-device processor(s) may receive additional audio data that captures an additional spoken utterance of the user. In some implementations, the on-device processor(s) may process, using the on-device ASR model (e.g., that was personalized based on at least the correction), the additional audio data to generate a plurality of additional speech hypotheses that are each predicted to correspond to the additional spoken utterance. In these implementations, and in response to determining that the plurality of additional speech hypotheses include at least the portion of the given speech hypothesis and the alternate speech hypothesis from the correction, the on-device processor(s) may again store, in the on-device storage of the client device, at least the portion of the given speech hypothesis and the alternate speech hypothesis, but as a pseudo-correction for the on-device ASR model, and optionally in association with the additional audio data that captures the additional spoken utterance.

For instance, further assume that the user of the client device provides an additional spoken utterance of "What did Khe Chai think of the meeting?". In this instance, the microphone(s) of the client device may generate the additional audio data that captures the additional spoken utterance, and the additional audio data may be processed using the on-device ASR model to generate a plurality of additional speech hypotheses for the additional spoken utterance, such as "What did Khe Chai think of the meeting?", "What did keychain think of the meeting?", "What did key why think of the meeting?", and so on. Notably, in this instance, the on-device ASR model correctly recognized "Khe Chai" in the additional spoken utterance (e.g., based on the on-device ASR model being previously updated based on the correction of "keychain" to "Khe Chai"), so the user is unlikely to provide any correction. Nonetheless, and even when the user does not provide any correction, the on-device processor(s) may again store, in the on-device storage of the client device, at least the portion of the given speech hypothesis (e.g., "keychain") and the alternate speech hypothesis (e.g., "Khe Chai"), but as a pseudo-correction for the on-device ASR model, and optionally in association with the additional audio data that captures the additional spoken utterance. Accordingly, the processor(s) of the client device may not only cause the on-device ASR model to be updated based on at least the correction, but also cause the on-device ASR model to be updated based on the pseudo-correction.

In additional or alternative implementations, the on-device processor(s) may process, using a baseline instance of the on-device ASR model (e.g., that was not personalized based on the correction or any other corrections), the additional audio data to generate a plurality of baseline speech hypotheses that are each predicted to correspond to the additional spoken utterance. Further, the on-device processor(s) may process, using a personalized instance of the on-device ASR model (e.g., that was personalized based on at least the correction), the additional audio data to generate a plurality of baseline speech hypotheses that are each predicted to correspond to the additional spoken utterance. In these implementations, and based on comparing one or more of the plurality of baseline speech hypotheses to one or more of the plurality of personalized speech hypotheses, the on-device processor(s) may again store, in the on-device storage of the client device, at least the portion of the given speech hypothesis and the alternate speech hypothesis, but as a pseudo-correction for the on-device ASR model, and optionally in association with the additional audio data that captures the additional spoken utterance.

For instance, further assume that the user of the client device provides an additional spoken utterance of "What did Khe Chai think of the meeting?". In this instance, the microphone(s) of the client device may generate the additional audio data that captures the additional spoken utterance, and the additional audio data may be processed using the baseline instance of the on-device ASR model to generate a plurality of baseline speech hypotheses for the additional spoken utterance, such as "What did keychain think of the meeting?", "What did key why think of the meeting?", "What did mai tai think of the meeting?", and so on. Further, the additional audio data may be processed using the personalized instance of the on-device ASR model to generate a plurality of personalized speech hypotheses for the additional spoken utterance, such as "What did Khe Chai think of the meeting?", "What did keychain think of the meeting?", "What did key why think of the meeting?", and so on. Notably, in this instance, the personalized instance of the on-device ASR model correctly recognized "Khe Chai" in the additional spoken utterance (e.g., based on the personalized instance of the on-device ASR model being previously updated based on the correction of "keychain" to "Khe Chai"), but the baseline instance of the on-device ASR model misrecognized "Khe Chai" in the additional spoken utterance (e.g., since the baseline instance of the on-device ASR model was not updated based on the correction of "keychain" to "Khe Chai"). Although the on-device processor(s) may select a given personalized speech hypothesis, from among the plurality of personalized speech hypotheses, the on-device processor(s) may utilize a given baseline speech hypothesis, from among the plurality of baseline speech hypotheses, to determine whether to generate a pseudo-correction.

Put another way, in this instance, the on-device processor(s) may identify an aligned difference between the given personalized speech hypothesis (e.g., "What did Khe Chai think of the meeting?") and the given baseline speech hypothesis (e.g., "What did keychain think of the meeting?") to determine that the personalized instance of the on-device ASR model would have made a misrecognition (e.g., "keychain" instead of "Khe Chai"), but for the personalized instance of the on-device ASR model being updated based on the prior correction. Accordingly, the on-device processor(s) may again store, in the on-device storage of the client device, at least the portion of the given speech hypothesis (e.g., "keychain") and the alternate speech hypothesis (e.g., "Khe Chai"), but as a pseudo-correction for the on-device ASR model, and optionally in association with the additional audio data that captures the additional spoken utterance.

As noted above, the on-device ASR model may be periodically updated based on corrections and/or other data stored in the training cache of the on-device storage of the client device to personalize the on-device ASR model to the user of the client device, but the corrections, the pseudo-corrections, and/or the other data may be periodically discarded from the training cache for various reasons (e.g., due to data minimization principles, due to compliance mandates, and/or due to other considerations). Put another way, the corrections, the pseudo-corrections, and/or the other data may each be stored in association with the corresponding TTL in the on-device storage of the client device, such that the corrections, the pseudo-corrections, and/or the other data may be purged from the training cache of the on-device storage of the client device when the corresponding TTL lapses.

Accordingly, in the above implementations and even when the corresponding TTL associated with the corrections lapses, the corresponding TTL associated with the pseudo-correction will lapse at a time that is subsequent to the corresponding TTL associated with the corrections lapsing even though the user did not explicitly make any correction (hence the term "pseudo-correction"). As a result, when the corresponding TTL associated with the correction does lapse, the on-device ASR model may be less susceptible to incorrectly recognizing future occurrences of "Khe Chai" in future spoken utterances assuming that one or more pseudo-corrections were generated and utilized in updating the on-device ASR model, thereby preventing forgetting of the on-device ASR model through generation and utilization of the pseudo-corrections. Notably, and assuming that the corresponding TTL associated with the correction has lapsed but that the corresponding TTL associated with the pseudo-correction has not lapsed, techniques described herein enable the on-device processor(s) to continue to generate additional pseudo-corrections with additional corresponding TTLs, thereby effectively extending the corresponding TTL that is associated with the original correction. Put another way, as long as the user continues to provide spoken utterances that include "Khe Chai", then the on-device processor(s) may continue generating pseudo-corrections based on ASR processing of the spoken utterances even after the corresponding TTL that is associated with the original correction has lapsed.

In various implementations, and in causing the on-device ASR model to be updated based on corrections and/or pseudo-corrections, the on-device processor(s) may obtain, from the on-device storage of the client device, the on-device ASR model. Further, the on-device processor(s) may also obtain, from the training cache of the on-device storage of the client device, the corrections and/or pseudo-corrections that are associated with a corresponding TTL in the on-device storage of the client device that has not lapsed. Moreover, and in causing the on-device ASR model to be updated based on a given correction or a given pseudo-correction, the on-device processor(s) may process, using the on-device ASR model, corresponding audio data that is associated with the given correction or the given pseudo-correction to generate a plurality of training speech hypotheses that each predicted to correspond to a corresponding spoken utterance that is captured in the corresponding audio data, utilize the corresponding alternate speech hypothesis, for the given correction or the given pseudo-correction, as a corresponding supervision signal to generate one or more corresponding losses for the on-device ASR model, and cause the on-device ASR model to be updated based on the one or more corresponding losses (e.g., via back propagation or another technique).

For instance, assume that, given correction or the given pseudo-correction, the corresponding portion of the given speech hypothesis is "keychain" and that the corresponding alternate speech hypothesis is "Khe Chai". In this instance, the on-device processor(s) may process, using the on-device ASR model, the corresponding audio data (e.g., capturing the spoken utterance of "Tell Khe Chai that I will miss the meeting" for the correction or capturing the additional spoken utterance of "What did Khe Chai think of the meeting?" for the pseudo-correction) to generate the plurality of training speech hypotheses (e.g., that may be based on whether the on-device processor(s) process the corresponding audio data for the correction or the pseudo-correction). Further, in this instance, assume that the plurality of training speech hypotheses include, for the corresponding portion of the given speech hypothesis, term hypotheses of "keychain", "key why", "mai tai", and "Khe Chai". Accordingly, the corresponding alternate speech hypothesis of "Khe Chai" may be utilized as the corresponding supervision signal to generate the one or more corresponding losses by, for comparing "Khe Chai" to each of the term hypotheses of "keychain", "key why", "mai tai", and "Khe Chai" to generate the one or more corresponding losses. Put another way, the corresponding alternate speech hypothesis of "Khe Chai" may be utilized as a ground truth label (and optionally associated with a ground truth value, (e.g., 1.0)) that may be compared to the term hypotheses of "keychain", "key why", "mai tai", and "Khe Chai" (or predicted values associated with each of the term hypotheses) to generate the one or more corresponding losses. As a result, the on-device processor(s) may bias subsequent ASR processing using the on-device ASR model towards the corresponding alternate speech hypothesis and/or away from the corresponding portion of the corresponding given speech hypothesis.

In some versions of those implementations, the on-device processor(s) may only cause the on-device ASR model to be updated in response to determining that one or more training conditions are satisfied. The one or more training conditions may include, for example, a time of day, a day of week, whether the client device is charging, whether the client device has a threshold state of charge, whether the client device is being held by the user, and/or other training conditions. As one non-limiting example, the on-device processor(s) may cause a baseline on-device ASR model to be updated from scratch each night between the hours 2:00 AM and 5:00 AM and assuming that the client device is charging or has a threshold state of charge, thereby personalizing the baseline on-device ASR model based on the training cached in the on-device storage of the client device. This ensures that the on-device ASR model, when utilized the following day, is sufficiently personalized for the user of the client device.

As used herein, the term dictation session can refer to any human-to-computer dialog session between the user and the automated assistant where the automated assistant is utilized to dictate one or more given speech hypotheses on behalf of the user, and for inclusion in a transcription that is associated with one or more software applications that are accessible at the client device (e.g., first-party software applications and/or third-party software applications). In some implementations, the spoken utterance may be received to initiate and complete the dictation session based on a single spoken utterance, whereas in other implementations, the spoken utterance may be received as part of an ongoing dictation session that is based on multiple spoken utterances. The one or more software applications can include any software application in which the user can dictate the one or more of the given speech hypotheses, such as an email application, a text messaging application, a calendar application, a notes application, an automated assistant application (e.g., that can transmit the dictated text to other software applications), and/or any other software application in which the user can dictate the one or more speech hypotheses and that is accessible at the client device. The transcription may include at least a body, and optionally be associated with one or more fields that are based on a given software application associated with the transcription. For example, the transcription can be associated with a "to" field and a "subject" field when the transcription is an email associated with an email application, a "recipient" field when the transcription is a text message associated with a text messaging application, a "date" field and/or a "time" field when the transcription is a calendar entry associated with a calendar application, a "title" field when the transcription is a note associated with a notes application, and so on.

As used herein, the term "first-party" may refer to a software application or system that is developed and/or maintained by the same entity that develops and/or maintains the automated assistant described herein. Further, as used herein, the term "third-party" may refer to a software application or system that is developed and/or maintained by an entity that is different from the entity that develops and/or maintains the automated assistant described herein. Accordingly, it should be understood that techniques described herein may be utilized solely by first-party software applications and/or systems, or may be provided as a service to third-party software applications and/or systems.

By implementing techniques described herein, one or more technical advantages may be achieved. As one non-limiting example, techniques described herein enable corresponding on-device ASR models to be personalized for respective users in a manner that prevents forgetting by the corresponding on-device ASR models. For instance, by causing the corresponding on-device ASR models to be updated based on corresponding corrections by the respective users, the corresponding on-device ASR models may be more accurate in terms of precision and recall with respect to these corrections while the corresponding corrections are associated with a corresponding TTL that has not lapsed. Further, by causing the corresponding on-device ASR models to additionally, or alternatively, be updated based on corresponding pseudo-corrections (e.g., that reflect corrections that the user would have made, but for the corresponding on-device ASR models being personalized based on the corresponding corrections), the corresponding on-device ASR models may be more accurate in terms of precision and recall with respect to these corrections while the corresponding pseudo-corrections are associated with a corresponding TTL that has not lapsed, thereby preventing forgetting by the corresponding on-device ASR models for a longer duration of time absent these techniques. Also, for instance, by causing the corresponding on-device ASR models to be updated based on the corresponding corrections and/or the corresponding pseudo-corrections, a quantity of instance of further user interface input provided by the user in making the corresponding corrections may be reduced, thereby concluding a human-to-computer dialog session in a more quick and efficient manner and resulting in conservation of computational resources at the client devices of the respective users.

The above description is provided as an overview of only some implementations disclosed herein. Those implementations, and other implementations, are described in additional detail herein.

DETAILED DESCRIPTION

Figure 1:
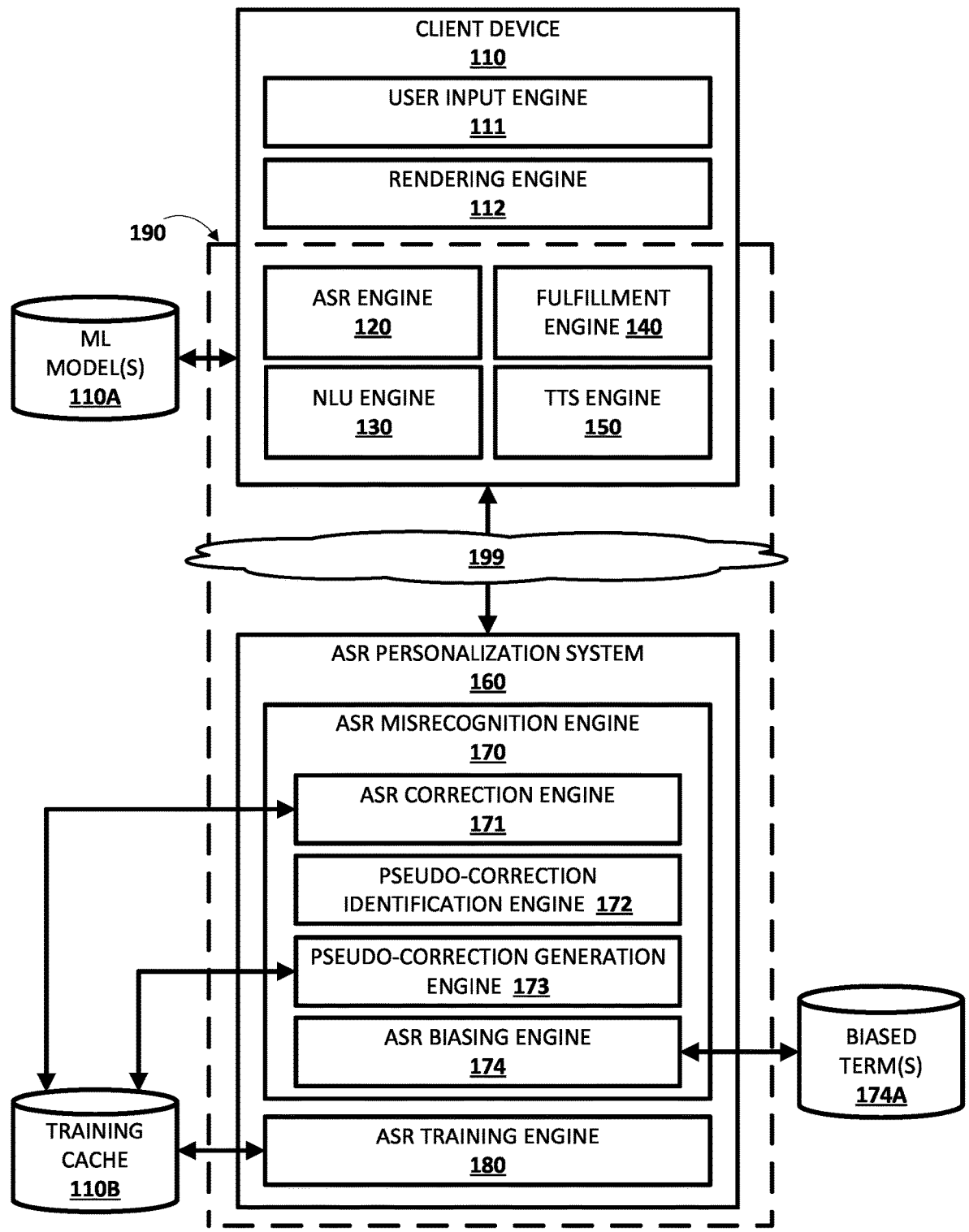
FIG. 1 depicts a block diagram of an example environment in which implementations disclosed herein may be implemented.

Turning now to FIG. 1, a block diagram of an example environment that demonstrates various aspects of the present disclosure is depicted. A client device 110 is illustrated in FIG. 1, and includes, in various implementations, a user input engine 111, a rendering engine 112, an automatic speech recognition (ASR) engine 120, a natural language understanding (NLU) engine 130, a fulfillment engine 140, and a text-to-speech (TTS) engine 150. The client device 110 can be, for example, a mobile device, a standalone device having a display, a standalone speaker device, a laptop, a computer, a home automation device, and/or any other device(s) capable of implementing a human-to-computer dialog session. An ASR personalization system 160 is also illustrated in FIG. 1, and includes, in various implementations, an ASR misrecognition engine 170 and an ASR training engine 180. In some implementations, the ASR personalization system 160 can be implemented by a remote system (e.g., one or more high performance servers) in communication with the client device 110 over network(s) 199 as shown in FIG. 1. The network(s) 190 can include, for example, one or more local area networks (e.g., Wi-Fi, Bluetooth, near-field communication, and/or other local area networks), one or more wide area networks (e.g., the Internet), and/or other network(s). In other implementations, the ASR personalization system 160 can be implemented locally at the client device 110. An automated assistant 190 can be implemented locally at the client device 110, remotely at least in part by the ASR personalization system 160, or at both in a distributed manner (e.g., as shown by the dashed line in FIG. 1). The automated assistant 190 can be an application that is separate from an operating system of the client device 110 (e.g., installed "on top" of the operating system)—or can alternatively be implemented directly by the operating system of the client device 110. Further, the automated assistant 190 can facilitate operations performed by the client device 110 and/or the ASR personalization system 160.

In various implementations, the user input engine 111 can detect various user inputs at the client device 110. The user inputs detected at the client device 110 can include, for example, spoken utterances detected via microphone(s) of the client device 110, touch input or typed input detected via a touch sensitive display and/or other input device of the client device 110, gesture inputs detected via vision component(s) of the client device 110, and/or other types of inputs. For example, in implementations where a given user input corresponds to a spoken utterance, the microphone(s) of the client device 110 can generate corresponding audio data that captures the spoken utterance. Further, the automated assistant 190 can cause the ASR engine 120 to process, using an on-device ASR model stored locally in on-device storage of the client device 110 (e.g., stored in machine learning (ML) model(s) database 110A), the spoken utterance to generate ASR data, such as a plurality of speech hypotheses that are each predicted to correspond to the spoken utterance captured in the audio data. Moreover, a given speech hypothesis, from among the plurality of speech hypotheses, may be selected as corresponding to the spoken utterance based on values generated in the ASR processing (e.g., probabilities, log likelihoods, and/or other values associated with term(s) and/or phrases(s) of the spoken utterance), and visually rendered for presentation to the user for presentation to the user via the display of the client device (e.g., via the rendering engine 112). In some implementations, the on-device ASR model can be an end-to-end ASR model that is used to directly generate the plurality of speech hypotheses and the values generated in the ASR processing. In additional or alternative implementations, the on-device ASR model can instead be used to generate a sequence of predicted phonemes, and the plurality of speech hypotheses can be determined based on values associated with the sequence of predicted phonemes.

In these implementations, the automated assistant 190 can cause the NLU engine 130 to process, using an on-device NLU model stored locally in the on-device storage of the client device 110 (e.g., stored in the ML model(s) database 110A), the ASR data to generate NLU data, such as intent(s) that correspond to the spoken utterance and optionally parameter(s) associated with the intent(s) and/or slot value(s) for the parameter(s) associated with the intent(s). Further, in these implementations, the automated assistant 190 can cause the fulfillment engine 140 to process, using fulfillment models and/or rules stored locally in the on-device storage of the client device 110 (e.g., stored in the ML model(s) database 110A), the NLU data to generate fulfillment data, such as local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to be performed based on the spoken utterance. Moreover, the automated assistant 190 can cause the TTS engine 150 to process, using a TTS model stored locally in the on-device storage of the client device 110 (e.g., stored in the ML model(s) database 110A), textual data formulated by the automated assistant 190 to generate synthesized speech audio data includes synthesized speech and that can be audibly rendered for presentation to the user via speaker(s) of the client device 110 (e.g., via the rendering engine 112).

Also, for example, in implementations where a given user input corresponds to typed input and/or touch input, the user input engine 111 may generate textual data and/or touch data that corresponds to the typed input or touch input, respectively. Further, the automated assistant 190 can refrain from causing the ASR engine 120 to process any data (e.g., since there is no audio data. However, the automated assistant 190 can cause the NLU engine 130 to process, using the on-device NLU model stored locally in the on-device storage of the client device 110 (e.g., stored in the ML model(s) database 110A), the textual data and/or the touch data to generate the NLU data. Further, the automated assistant 190 can cause the fulfillment engine 140 to process, using the fulfillment models and/or rules stored locally in the on-device storage of the client device 110 (e.g., stored in the ML model(s) database 110A), the NLU data to generate the fulfillment data. Moreover, the automated assistant 190 can cause the TTS engine 150 to process, using the TTS model stored locally in the on-device storage of the client device 110 (e.g., stored in the ML model(s) database 110A), the textual data formulated by the automated assistant 190 to generate the synthesized speech audio data that includes the synthesized speech and that can be audibly rendered for presentation to the user via the speaker(s) of the client device 110 (e.g., via the rendering engine 112).

In some implementations, and although not depicted, cloud-based automated assistant components can include a remote ASR engine, a remote NLU engine, a remote fulfillment engine, and/or a remote TTS engine. In these implementations, a remote execution module can also optionally be included that performs remote execution of the same or similar operations described with respect to the above engines of the client device 110. Additional and/or alternative remote engines can be included. As described herein, in various implementations on-device speech processing, on-device NLU, on-device fulfillment, and/or on-device TTS can be prioritized at least due to increased security of user data, latency reduction, and/or network usage reduction provided by on-device processing (due to no client-server roundtrip(s) being needed to resolve the spoken utterance). However, these remote component(s) can be utilized at least selectively. For example, such component(s) can be utilized in parallel with on-device component(s) and output from such component(s) utilized when local component(s) fail.

In various implementations, the ASR misrecognition engine 170 may include an ASR correction engine 171, a pseudo-correction identification engine 172, a pseudo-correction generation engine 173, and an ASR biasing engine 174. The various engines of the ASR misrecognition engine 170 may not only be utilized to identify ASR corrections (e.g., via the ASR correction engine 171), but also to identify and generate ASR pseudo-correction (e.g., via the pseudo-correction engine 172 and pseudo-correction generation engine 173). Accordingly, when the on-device ASR model that is stored locally in the on-device storage of the client device 110 is subsequently updated based on corrections and/or pseudo-corrections stored in the on-device storage of the client device 110 (e.g., in training cache database 110B), the on-device ASR processing may be biased towards and/or away from certain phrases (e.g., via the biasing engine 174 utilizing certain term(s) and/or phrases stored in biased term(s) database 174A). Accordingly, the on-device ASR model that is stored in the ML model(s) database 110A and that is local to the client device 110A may be personalized in a manner that prevents forgetting (e.g., personalized via the ASR training engine 180). The ASR misrecognition engine 170 and the ASR training engine 180 are described in more detail herein (e.g., with respect to FIGS. 2, 3, and 4A-4C).

Figure 2:
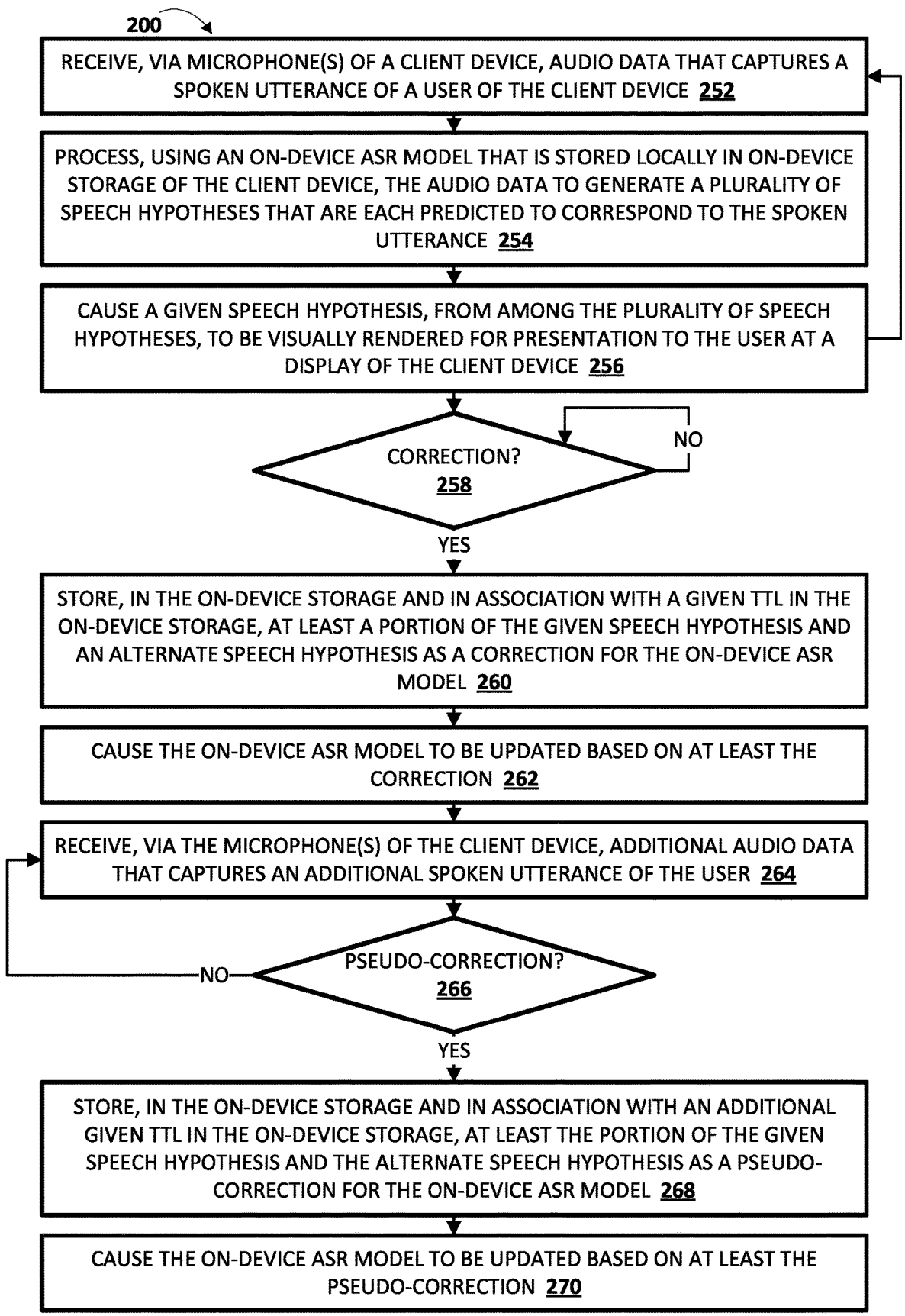
FIG. 2 depicts a flowchart illustrating an example method of generating pseudo-correction(s) for utilization in personalizing an on-device automatic speech recognition (ASR) model, in accordance with various implementations.

Turning now to FIG. 2, a flowchart illustrating an example method 200 of generating pseudo-correction(s) for utilization in personalizing an on-device automatic speech recognition (ASR) model is depicted. For convenience, the operations of the method 200 are described with reference to a system that performs the operations. The system of method 200 includes one or more processors and/or other component(s) of a client device (e.g., the client device 110 of FIG. 1, client device 410 of FIGS. 4A-4C, computing device 510 of FIG. 5, and/or other client devices). Moreover, while operations of the method 200 are shown in a particular order, this is not meant to be limiting. One or more operations may be reordered, omitted, or added.

At block 252, the system receives, via one or more microphones of a client device, audio data that captures a spoken utterance of a user of the client device (e.g., via the user input engine 111 of the client device 110 from FIG. 1). In some implementations, the audio data may only be received in response to determining that the spoken utterance is directed to the system. For example, the spoken utterance may include a particular word or phrase (e.g., "Assistant", "Hey Assistant", "Okay Assistant", or the like) to invoke the system. As another example, the user may actuate a button (e.g., hardware button or software button) of the client device to invoke the system.

At block 254, the system processes, using an on-device ASR model, that is stored locally in on-device storage of the client device, the audio data to generate a plurality of speech hypotheses that are each predicted to correspond to the spoken utterance (e.g., as described with respect to the ASR engine 120 of the client device 110 from FIG. 1). At block 256, the system causes a given speech hypothesis, from among the plurality of speech hypotheses, to be visually rendered for presentation to the user at a display of the client device. The system may return to block 252 to receive additional audio data that captures additional spoken utterances of the user (e.g., via the rendering engine 112 of the client device 110 from FIG. 1), if any, and proceed with an additional iteration of the method 200 of FIG. 2. For example, the system may generate the plurality of speech hypotheses, and may select the given speech hypothesis based on values associated with one or more terms or phrases of the given speech hypothesis that are indicative of the highest likelihood as corresponding to the spoken utterance. The given speech hypothesis may be, for example, incorporated into a transcription as part of a human-to-computer dialog session between the user and the system.

At block 258, the system determines whether further user input is received that corresponds to a correction directed to the ASR processing of the audio data (e.g., via the user input engine 111 of the client device 110 from FIG. 1). For example, the further user input may correspond to spoken input, typed input, touch input, or other input that causes a portion of the given speech hypothesis to be modified to an alternate speech hypothesis. In various implementations, the system may utilize one or more techniques to determine whether the further user inputs corresponds to a correction that is directed to the ASR processing of the audio data (e.g., using the ASR correction engine 171 of the ASR personalization system 160 from FIG. 1). For example, the system may consider the further user interface input as correction that is directed to the ASR processing of the audio data based on an edit distance (e.g., Levenshtein distance) between the portion of the given speech hypothesis and the alternate speech hypothesis, based on phonetic similarity between the portion of the given speech hypothesis and the alternate speech hypothesis, based on whether other client devices have modified the portion of the given speech hypothesis to the alternate speech hypothesis, and/or based on other considerations. For instance, if the further user interface input modifies "keychain" to "Khe Chai", then the system may determine that this modification corresponds to a correction based on the edit distance between these terms and/or based on phonetic similarity between these terms. However, if the further user interface input modifies "keychain" to "John Smith", then the system may determine that this modification does not correspond to a correction based on the edit distance between these terms and/or based on phonetic similarity between these terms.

If, at block 258, the system determines that no further user input is received that corresponds to a correction directed to the ASR processing of the audio data, then the system may continue monitoring for the further user input at block 258. Notably, the further user interface input may be received after other spoken utterances are provided by the user. Accordingly, the system may continually monitor for corrections while performing other operations of the method 200 of FIG. 2. If, at block 258, the system determines that further user input is received that corresponds to a correction directed to the ASR processing of the audio data, then the system may proceed to block 260.

At block 260, the system stores, in the on-device storage an in association with a given time to live (TTL) in the on-device storage, at least a portion of the given speech hypothesis and an alternate speech hypothesis as a correction for the on-device ASR model (e.g., in the training cache database 1108 from FIG. 1). At block 262, the system causes the on-device ASR model to be updated based on at least the correction (e.g., as described in more detail with respect to FIG. 3). Accordingly, at block 262, the on-device ASR model is personalized to the user, and based on at least the correction, to mitigate future occurrences of the ASR misrecognition that resulted in the user providing the correction (e.g., through utilization of the biasing engine 174 from FIG. 1 and/or term(s) or phrase(s) stored in the biased term(s) database 174A form FIG. 1, such as biasing ASR processing towards "Khe Chai" and/or away from "keychain" from the above instance). In various implementations, the system may also store the audio data that was utilized to generate at least the portion of the given speech hypothesis in association with the correction. Notably, the correction is stored in association with a given TTL in the on-device storage, and the on-device ASR model may only be updated based on the correction prior to the given TTL lapsing. The given TTL may correspond to any duration of time (e.g., a week, a month, two months, six months, and/or other durations of time). However, absent techniques described herein, when the given TTL stored in association with the correction lapses and the on-device ASR model is subsequently updated, the on-device ASR model may be subject to forgetting the ASR misrecognition that resulted in the user providing the correction such that the user may be required to again provide the correction.

At block 264, the system receives, via one or more of the microphones of the client devices, additional audio data that captures an additional spoken utterance of the user (e.g., in the same or similar manner described with respect to the operations of block 252). At block 266, the system determines whether to generate a pseudo-correction based on ASR processing of the additional audio data (e.g., using the pseudo-correction identification engine 172 and/or the pseudo-correction generation engine 173 from FIG. 1). The system may determine whether to generate a pseudo-correction based on further ASR processing of the additional audio data that captures the additional spoken utterance.

In some implementations, the system may process, using the on-device ASR model that was previously updated based on at least the correction (e.g., the on-device ASR model that was updated at block 262), the additional audio data to generate a plurality of additional speech hypotheses. Further, and in response to determining that the plurality of additional speech hypotheses include at least the portion of the given speech hypothesis and the alternate speech hypothesis from a given correction that was previously generated at the client device, the system may determine to generate the pseudo-correction.

Continuing with the above instance where the correction included the portion of the given speech hypothesis of "keychain" and the alternate speech hypothesis of "Khe Chai", if the system, in processing the additional audio data and using the on-device ASR model that was previously updated based on at least the correction, generates the plurality of additional speech hypothesis and they include "keychain" and "Khe Chai", then the system may generate a pseudo-correction that includes the portion of the given speech hypothesis of "keychain" and the alternate speech hypothesis of "Khe Chai". Notably, in this instance, the system is likely to select the alternate speech hypothesis of "Khe Chai" over the portion of the given speech hypothesis of "keychain" based on the prior personalization of the on-device ASR model. However, and without the personalization of the on-device ASR model, the system likely would have selected the portion of the given speech hypothesis of "keychain" over the alternate speech hypothesis of "Khe Chai", and the user would have likely provided additional further user interface input to modify the given speech hypothesis of "keychain" over the alternate speech hypothesis of "Khe Chai" as an additional correction. Put another way, the system generates the pseudo-correction instances where the on-device ASR model would have made the ASR misrecognition, but for the user making the prior correction and the on-device ASR model being updated based on the prior correction. In various implementations, and although not depicted in FIG. 2, the system may also cause a given additional speech hypothesis, from among the plurality of additional speech hypotheses, to be visually rendered for presentation to the user via the display of the client device. This provides the user with an opportunity to provide any additional corrections based on the ASR processing of the additional audio data.

In additional or alternative implementations, the system may process, using a baseline instance on-device ASR model that has not been updated based on any corrections (e.g., the on-device ASR model that was initially utilized to process the audio data at block 254), the additional audio data to generate a plurality of baseline speech hypotheses. Further, the system may process, using a personalized instance of the on-device ASR model (e.g., the on-device ASR model that was updated at block 262), to generate a plurality of personalized speech hypotheses. Moreover, and in response to determining that an aligned difference between at least a given baseline speech hypothesis, from among the plurality of baseline speech hypotheses, and a given personalized speech hypothesis, from among the plurality of personalized speech hypotheses, include at least the portion of the given speech hypothesis and the alternate speech hypothesis from a given correction that was previously generated at the client device, the system may determine to generate the pseudo-correction. Notably, the system may consider the aligned difference between at least the given baseline speech hypothesis and the given personalized speech hypothesis. In these implementations, the aligned difference between these speech hypotheses may be utilized as a signal to indicate that the personalized instance of the on-device ASR model would have made an ASR misrecognition, but for the personalization of the on-device ASR model.

Continuing with the above instance where the correction included the portion of the given speech hypothesis of "keychain" and the alternate speech hypothesis of "Khe Chai", if the system, in processing the additional audio data using the baseline instance of the on-device ASR model that was not previously updated based on any corrections and in processing the additional audio data using the personalized instance of the on-device ASR model that was previously updated based on the correction, determines that the aligned difference between these speech hypotheses is "keychain" and "Khe Chai", then the system may generate a pseudo-correction that includes the portion of the given speech hypothesis of "keychain" and the alternate speech hypothesis of "Khe Chai". Notably, in this instance, the system does not provide, or otherwise utilize, the given baseline speech hypothesis but to determine whether to generate the pseudo-correction. Similar to the above implementations, the system generates the pseudo-correction instances where the personalized instance of the on-device ASR model would have made the ASR misrecognition, but for the user making the prior correction and the baseline instance of the on-device ASR model being updated based on the prior correction to generate the personalized instance of the on-device ASR model. If, at an iteration of block 266, the system determines not to generate a pseudo-correction based on ASR processing of the additional audio data, the system may return to block 264 to receive further additional audio data that captures further additional spoken utterances of the user. The system may repeat the operations of blocks 264 and 266 to identify and generate pseudo-corrections. Notably, while the system repeats the operations of blocks 264 and 266 to identify and generate pseudo-corrections, the system may also repeat the operations of blocks 252-262 in a parallel manner to identify and generate additional corrections. If, at an iteration of block 266, the system determines to generate a pseudo-correction based on ASR processing of the additional audio data, the system may proceed to block 268.

At block 268, the system stores, in the on-device storage and in association with an additional given TTL in the on-device storage, at least the portion of the given speech hypothesis and the alternate speech hypothesis as a pseudo-correction for the on-device ASR model (e.g., in the training cache database 1108 from FIG. 1). In various implementations, the system may also store the audio data that was utilized to generate at least the portion of the given speech hypothesis in association with the correction. At block 270, the system causes the on-device ASR model to be updated based on at least the pseudo-correction (e.g., as described in more detail with respect to FIG. 3). Accordingly, at block 270, the on-device ASR model is again personalized to the user, and based on at least the pseudo-correction, to mitigate future occurrences of the ASR misrecognition that resulted in the user providing the original correction (e.g., through utilization of the biasing engine 174 from FIG. 1 and/or term(s) or phrase(s) stored in the biased term(s) database 174A form FIG. 1, such as biasing ASR processing towards "Khe Chai" and/or away from "keychain" from the above instance). In various implementations, the system may also store the audio data that was utilized to generate at least the portion of the given speech hypothesis in association with the correction. Notably, the pseudo-correction is stored in association with a given additional TTL in the on-device storage and is a pseudo-correction that is prior on a prior actual correction made by the user of the client device, and the on-device ASR model may only be updated based on the correction prior to the given TTL lapsing and based on the pseudo-correction prior to the given additional TTL lapsing. Similarly, the given additional TTL may also correspond to any duration of time (e.g., a week, a month, two months, six months, and/or other durations of time). Accordingly, when the given TTL stored in association with the correction lapses, the on-device ASR model may still be updated based on the pseudo-correction. As a result, the on-device ASR model may not be subject to forgetting the ASR misrecognition that resulted in the user providing the correction such that the user may not be required to again provide the correction.

Although FIG. 2 is described with respect to a single flowchart, it should be understood that is for the sake of example and is not meant to be limiting. Rather, it should be understood that certain operations of the method 200 of FIG. 2 may be temporally distinct. For example, the audio data that captures the spoken utterance may be received at a first time instance, of a plurality of time instances, and as part of a human-to-computer dialog session between the user and the system, and the correction may be generated as part of the human-to-computer dialog session between the user and the system. Further, the on-device ASR model may be updated at block 262 at a second time instance, of the plurality of time instances, that is subsequent to the first time instance. Moreover, the additional audio data that captures the additional spoken utterance may be received at a third time instance, of the plurality of time instances, and as part of the human-to-computer dialog session between the user and the system or as part of an additional human-to-computer dialog session between the user and the system, and the pseudo-correction may be generated as part of the additional human-to-computer dialog session between the user and the system. In this example, the third time instance is subsequent to the first time instance, but may occur prior to the second time instance or subsequent to the second time instance. Additionally, the on-device ASR model may be updated at block 270 at a fourth time instance, of the plurality of time instances, that is subsequent to the first time instance, but may be the same as the second time instance or subsequent to the third time instance. Accordingly, it should be understood that the method 200 of FIG. 2 is provided to illustrate various techniques contemplated herein, but is not meant to be limiting and the various techniques contemplated herein may be dependent on various inputs provided by the user throughout one or more human-to-computer dialog sessions.

Further, although FIG. 2 is depicted with respect to a single pseudo-correction correction being generated based on a single correction, it should be understood that is for the sake of example to illustrate techniques described herein, and is not meant to be limiting. For example, the audio data that captures the spoken utterance may be received at a first time instance, of a plurality of time instances, and as part of a human-to-computer dialog session between the user and the system, and the correction may be generated as part of the human-to-computer dialog session between the user and the system. Accordingly, the correction may be associated with a corresponding TTL that indicates the correction will no longer be utilized in updating the on-device ASR model after, for example, 63 days. In this example, the additional audio data that captures the additional spoken utterance may be received at a second time instance, of the plurality of time instances, and as part of an additional human-to-computer dialog session between the user and the system, and the pseudo-correction may be generated as part of the additional human-to-computer dialog session between the user and the system. In this example, assume that the second time instance is subsequent to the first time instance, such as 10 days after the user made the original correction. Accordingly, the pseudo-correction may be associated with an additional corresponding TTL that indicates the pseudo-correction will no longer be utilized in updating the on-device ASR model after, for example, 63 days, thereby extending a duration of time that the on-device ASR model is updated based on the original correction by 10 days (e.g., through utilization of the pseudo-correction). Even after the corresponding TTL that indicates the correction will no longer be utilized in updating the on-device ASR model after the 63 days, the system may still continue generating pseudo-corrections for another 10 days since the additional corresponding TTL that indicates the pseudo-correction will not lapse for another 10 days. Put another way, additional pseudo-corrections may be generated based on prior pseudo-corrections even in instances where the corresponding TTL that is associated with the original correction has lapsed.

Figure 3:
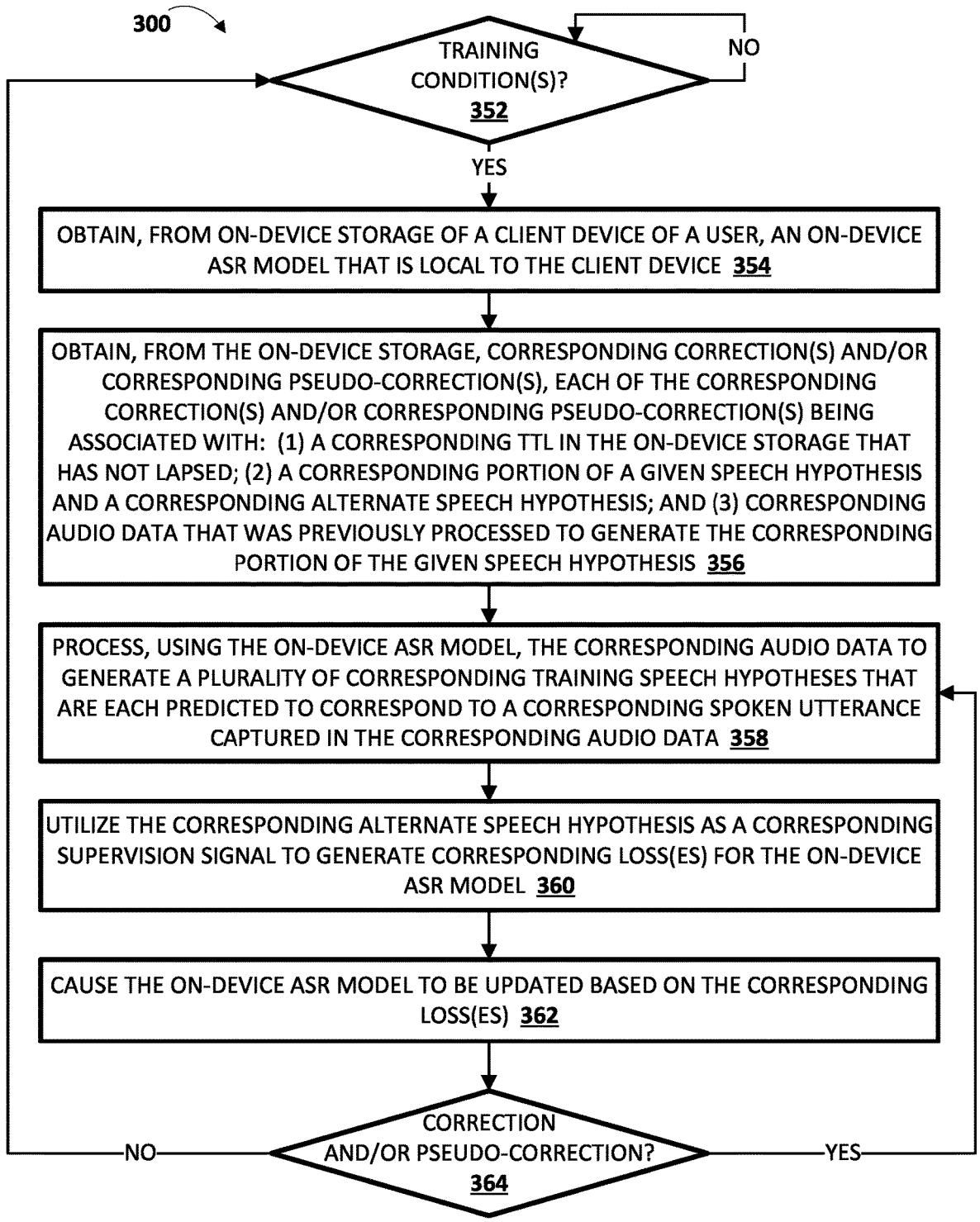
FIG. 3 depicts a flowchart illustrating an example method of utilizing pseudo-correction in personalization of an on-device automatic speech recognition (ASR) model, in accordance with various implementations.

Turning now to FIG. 3, a flowchart illustrating an example method 300 of utilizing pseudo-correction in personalization of an on-device automatic speech recognition (ASR) model is depicted. For convenience, the operations of the method 300 are described with reference to a system that performs the operations. The system of method 300 includes one or more processors and/or other component(s) of a client device (e.g., the client device 110 of FIG. 1, client device 410 of FIGS. 4A-4C, computing device 510 of FIG. 5, and/or other client devices). Moreover, while operations of the method 300 are shown in a particular order, this is not meant to be limiting. One or more operations may be reordered, omitted, or added.

At block 352, the system determines whether one or more training conditions are satisfied for personalizing an on-device ASR model locally at a client device (e.g., determined using the ASR training engine 180 from FIG. 1). The one or more training conditions can include, for example, a time of day, a day of week, whether the client device is charging, whether the client device has a threshold state of charge, whether the client device is being held by the user, whether any corrections and/or pseudo-corrections exist that may be utilized in personalizing the on-device ASR model, whether the client device is above and/or below a threshold temperature, and/or other conditions. If, at an iteration of block 352, the system determines that one or more training conditions are not satisfied, then the system may continue monitoring for satisfaction of the one or more training conditions at block 352. If, at an iteration of block 352, the system determines that one or more training conditions are not satisfied, then the system may proceed to block 354 to personalize the on-device ASR model of the client device.

At block 354, the system obtains, from on-device storage of a client device of a user, an on-device ASR model that is local to the client device (e.g., from the ML model(s) database 110A from FIG. 1). At block 356, the system obtains, from the on-device storage one or more corresponding corrections and/or one or more corresponding pseudo-corrections, each of the one or more corresponding corrections and/or the one or more corresponding pseudo-corrections being associated with: (1) a corresponding TTL in the on-device storage that has not lapsed; (2) a corresponding portion of a given speech hypothesis and a corresponding alternate speech hypothesis; and (3) corresponding audio data that was previously processed to generate the corresponding portion of the given speech hypothesis (e.g., from the training cached 110B from FIG. 1). Put another way, the system may personalize a baseline on-device ASR model locally at the client device when the one or more training conditions satisfied to generate a personalized on-device ASR model based on one or more corresponding corrections made by the user (e.g., as described with respect to block 258 of the method 200 of FIG. 2) and/or based on one or more corresponding pseudo-corrections generated based on one or more of the corresponding corrections previously made by the user (e.g., as described with respect to block 266 of the method 200 of FIG. 2). In various implementations, the system may personalize a baseline on-device ASR model locally at the client device, for example, each night when the one or more training conditions satisfied such that the resulting on-device ASR model learns from the one or more corresponding corrections and/or the one or more corresponding pseudo-corrections each night. In other implementations, the system may update a personalized on-device ASR model locally at the client device, for example, each night when the one or more training conditions satisfied such that the resulting on-device ASR model learns from the one or more corresponding corrections and/or the one or more corresponding pseudo-corrections as they are generated and stored in a training cache (e.g., the training cached 1108 from FIG. 1).

At block 358, and for a given correction, from among the one or more corresponding corrections, and/or a given pseudo-correction, from among the one or more corresponding pseudo-corrections, the system processes, using the on-device ASR model, the corresponding audio data to generate a plurality of corresponding training speech hypotheses that are each predicted to correspond to a corresponding spoken utterance captured in the corresponding audio data (e.g., via the ASR training engine 180 from FIG. 1). At block 360, the system utilizes the corresponding alternate speech hypothesis, for the given correction and/or the given pseudo-correction, as a corresponding supervision signal to generate one or more corresponding losses for the on-device ASR model (e.g., via the ASR training engine 180 from FIG. 1). At block 362, the system causes the on-device ASR model to be updated based on one or more of the corresponding losses (e.g., via the ASR training engine 180 from FIG. 1).

For example, assume that the given correction and/or the given pseudo-correction includes the corresponding portion of the given speech hypothesis of "keychain" and the corresponding alternate speech hypothesis of "Khe Chai". In this example, the system can process, using the on-device ASR model (e.g., a baseline on-device ASR model and/or a previously personalized on-device ASR model), the corresponding audio data that was initially processed to generate the corresponding portion of the given speech hypothesis of "keychain" to generate the plurality of training speech hypotheses, such as "keychain", "key why", "mai tai", and/or other speech hypotheses, and to generate value for each of the plurality of speech hypotheses. For instance, the plurality of training speech hypotheses may be represented as a speech hypotheses vector of [keychain, key why, mai tai] and may be associated with a value vector of [0.55, 0.35, 0.10]. In this instance, the corresponding alternate speech hypothesis of "Khe Chai" may be utilized as a supervision signal to generate the one or more corresponding losses, such as based on a ground truth vector of [keychain, key why, mai tai, Khe Chai] that is associated with a ground truth value vector of [0.00, 0.00, 0.00, 1.00] to indicate that the on-device ASR model should have generated and selected the corresponding alternate speech hypothesis of "Khe Chai" as corresponding to the corresponding spoken utterance that is captured in the corresponding audio data. Accordingly, in this instance, these vectors may be compared to generate the one or more corresponding losses, and the on-device ASR model may be updated based on the one or more corresponding losses (e.g., via back propagation or another technique). As a result, the on-device ASR model may be personalized to recognize "Khe Chai" to mitigate future occurrences of ASR misrecognitions when the user says "Khe Chai".

At block 358, the system determines whether there is an additional given correction, from among the one or more corresponding corrections, and/or an additional given pseudo-correction, from among the one or more corresponding pseudo-corrections, to be utilized in updating the on-device ASR model (e.g., stored in the training cache 1108 from FIG. 1). If, at an iteration of block 358, the system determines that there is an additional given correction and/or an additional given pseudo-correction to be utilized in updating the on-device ASR model, the system may return to block 358 and update the on-device ASR model based on the additional given correction and/or the given additional pseudo-correction. This process may be repeated for any further additional given corrections and/or any further additional given pseudo-corrections. If, at an iteration of block 358, the system determines that there is not an additional given correction and/or an additional given pseudo-correction to be utilized in updating the on-device ASR model, the system may return to block 352.

Although the method 300 of FIG. 3 is described with respect to a single iteration of the operations of block 352, it should be understood that is for the sake of brevity and is not meant to be limiting. For example, it should be understood that an iteration of the operations of block 352 may be performed as a background process as the system performs the method 300 of FIG. 3 such that if the one or more training conditions are not satisfied at any given time, the method 300 of FIG. 3 may be temporarily halted or paused and subsequently resumed at a later time when the one or more training conditions are satisfied and/or may be canceled altogether.

Further, although FIG. 3 is described with respect to the on-device ASR model being updated based on given corrections and/or given pseudo-corrections, it should be understood that is for the sake of example and is not meant to be limiting. Rather, it should be understood that the availability of the given corrections and/or the given pseudo-corrections is based on the corresponding TTLs that are stored in association with each of the given corrections and/or each of the given pseudo-corrections. However, it should be noted that, since each the given pseudo-corrections are generated based on a prior correction made by the user at the client device, the corresponding TTLs that are stored in association with the given pseudo-corrections should lapse subsequent to the corresponding TTLs that are stored in association with the original corrections. As a result, in some implementations, the system may only cause the on-device ASR model to be updated based on the corresponding pseudo-corrections and that the given corrections and/or the given pseudo-corrections that are available for utilization in personalizing the on-device ASR model may be a function of the user's interactions with the client device across a duration of time, and the system may only update the on-device ASR model based on the given corrections and/or the given pseudo-corrections that are associated with corresponding TTLs that have not lapsed.

Figure 4A:
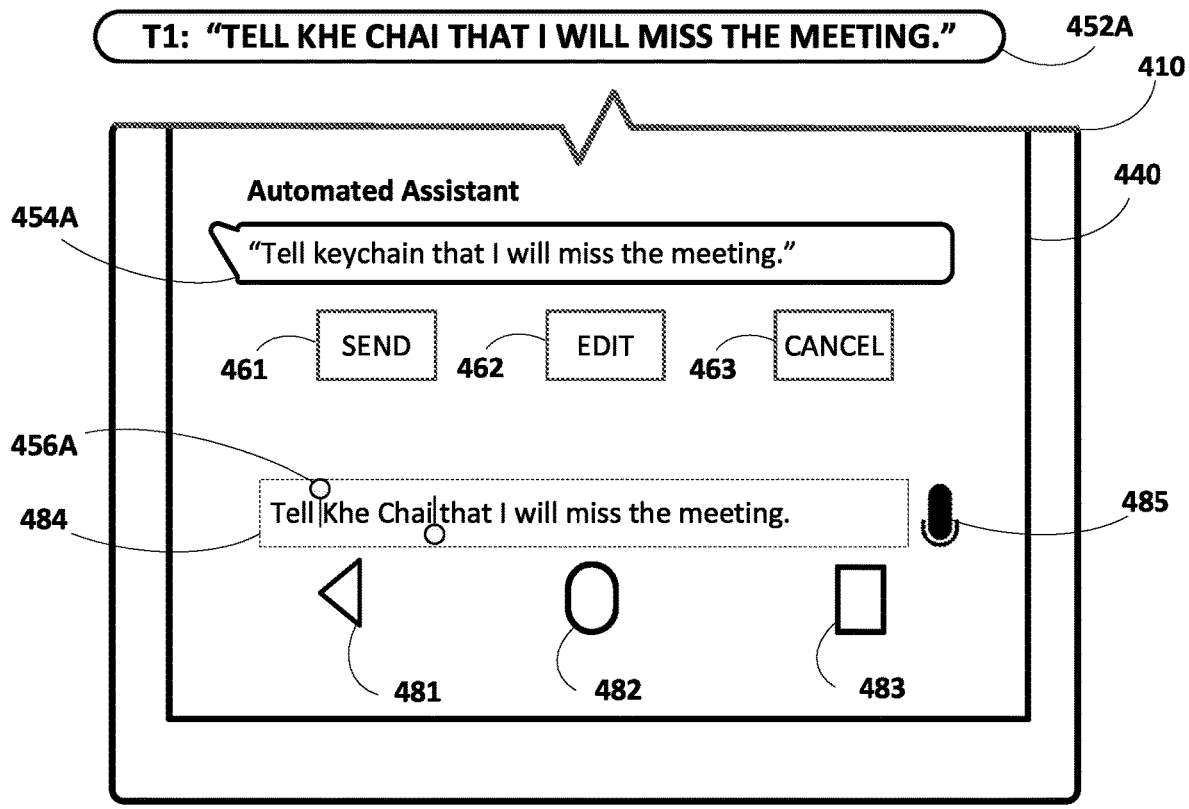
FIG. 4A, FIG. 4B, and FIG. 4C depict various user interfaces illustrating example user interactions with a client device, in accordance with various implementations.
Figure 4B:
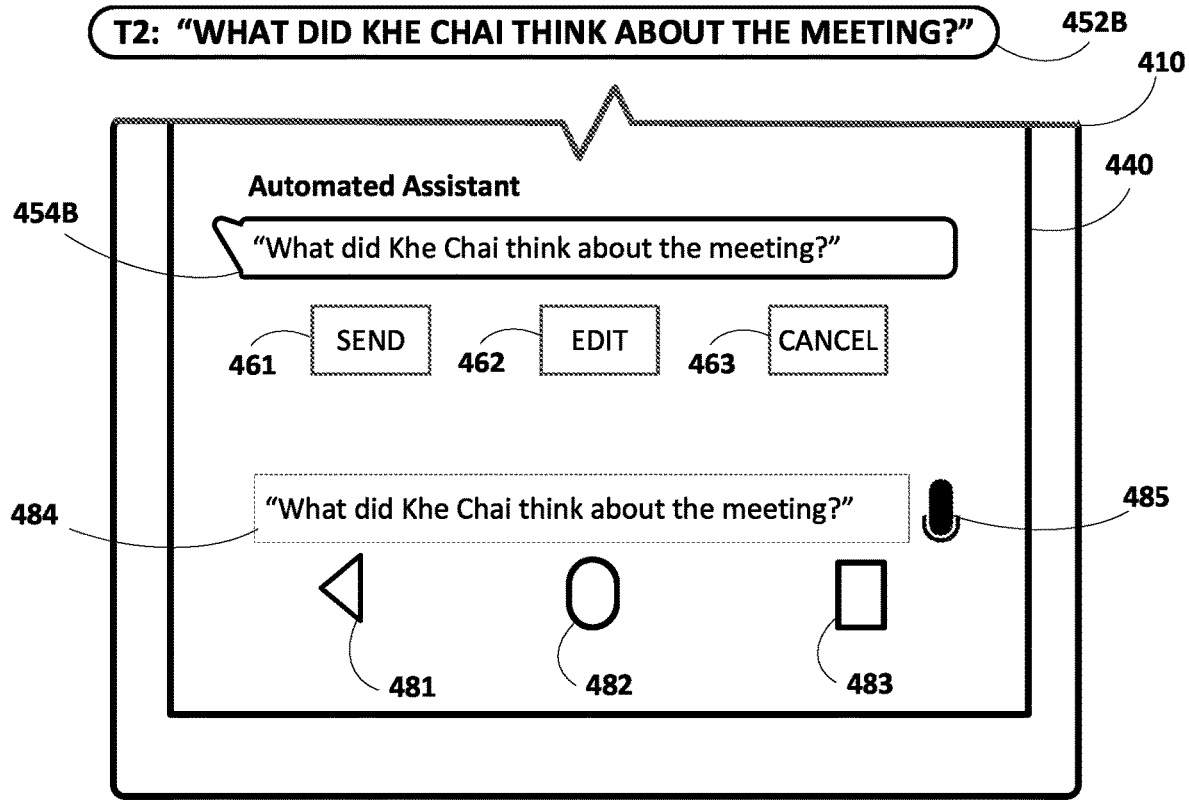
Figure 4C:
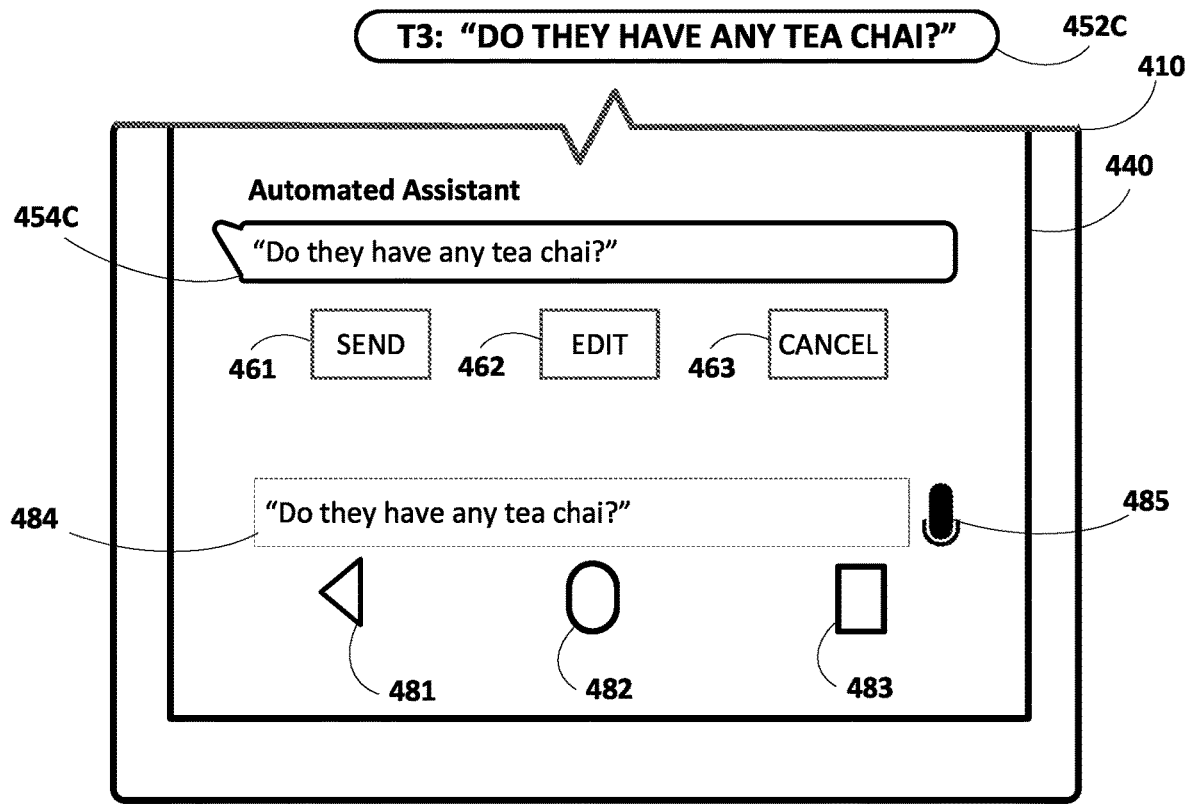
Figure 4C:
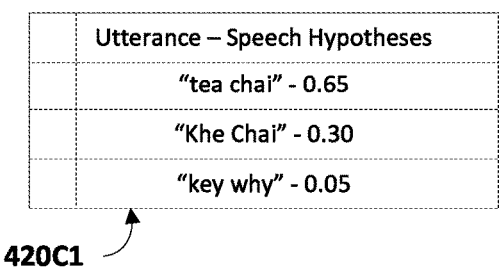
Figure 4C:
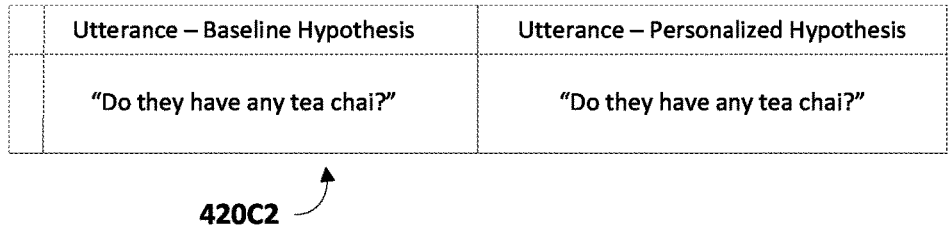

Turning now to FIGS. 4A-4C, various user interfaces illustrating example user interactions with a client device 410 (e.g., an instance of the client device 110 from FIG. 1) is depicted. The client device 410 of FIGS. 4A-4C includes a touch-sensitive display screen 440 that displays and/or streams (i.e., in real-time) given speech hypotheses that are predicted to correspond to spoken utterances provided by a user of the client device 410 according to implementations disclosed herein. For convenience, operations performed by the client device 410 are described with reference to an automated assistant (e.g., the automated assistant 190 of FIG. 1) that performs the operations.

The display screen 440 includes a textual reply and/or editing element 484 that allows a user to provide user input (e.g., touch input or typed input) for generating, modifying, deleting, and/or replacing term(s) via a virtual keyboard. Further, the display screen 440 also includes a voice interface element 485 that, when activated, allows the user to provide user input (e.g., spoken input) for affirming an action being performed by the client device 410, canceling an action being performed by the client device 410, and/or providing the spoken utterance or additional spoken utterances via one or more microphones. In some implementations, audio data corresponding to a spoken utterance can be captured via one or more of the microphones, a given speech hypothesis that is predicted to correspond to the spoken utterance can be visually rendered on the display screen 440 of the client device 410, and user input correcting the at least a portion of the given speech hypothesis to an alternate speech hypothesis can be touch input directed to the predicted textual segment(s) included in the textual reply and/or editing element 484 of the display screen 440 of the client device 410. In additional and/or alternative implementations, the user input correcting the portion of the given speech hypothesis to the alternate speech hypothesis can be spoken input. In some versions of these implementations, the spoken input is received in response touch input directed to the voice interface element 485, the spoken input is received within a threshold amount of time of the user input while the one or more microphones are activated without any touch input directed to the voice interface element 485, and/or other spoken input activation methods. Moreover, in some implementations, the display screen 440 also includes system interface elements 481, 482, 483 that may be interacted with by the user to cause the computing device 410 to perform one or more actions.

Moreover, in some implementations, a spoken utterance may include an action to be performed by the automated assistant using the client device 410. As some non-limiting examples, the action may be an action of calling or dialing a phone number, sending a text or SMS message (e.g., as shown in FIGS. 4A, 4B. and 4C), sending an email, looking up contact information, requesting navigational information, sending a calendar invitation, controlling one or more IoT devices, and/or other actions capable of being performed by the automated assistant operating on the client device 410. In the example of FIGS. 4A-4C, spoken utterances are received as part of disparate human-to-computer dialog sessions between the user of the client device 410 and the automated assistant in which the user is dictating a text message to the automated assistant that is to be sent to an additional user. Accordingly, the display 440 may additionally, or alternatively, include various interface elements 461, 462, 463 that are associated with the text message. For instance, the user may be presented with a send interface element 461 that, when selected by the user, causes the text message to be sent to the additional user, an edit interface element 462 that, when selected by the user, enables the user to edit the text message prior to the text message being sent to be sent to the additional user, and a cancel interface element 463 that, when selected by the user, causes the text message to be canceled without ever being sent to the additional user. However, it should be understood that the interface elements 461, 462, 463 are provided for the sake of example to illustrate various techniques contemplated herein and are not meant to be limiting. Rather, it should be understood that other interface elements that are associated with other actions may be provided for presentation to the user.

Referring specifically to FIG. 4A, assume that a user of the client device 410 provides a spoken utterance 452A of "Tell Khe Chai that I will miss the meeting" at a first time instance of a plurality of time instances (e.g., as indicated by T1). In this example, audio data that captures the spoken utterance 452A can be generated by one or more microphones of the client device 410, and the automated assistant can cause the audio data to be processed using an on-device ASR model stored in on-device storage of the client device 410 (e.g., stored in the ML model(s) database 110A from FIG. 1). In processing the audio data using the on-device ASR model, the automated assistant can generate a plurality of speech hypotheses that are predicted to correspond to the spoken utterance 452A. The plurality of speech hypotheses may include term hypotheses and/or transcription hypotheses, such as term hypotheses of "keychain", "key why", and "mai tai" (e.g., as shown in table 420A) for a portion of the spoken utterance 452A that corresponds to "Khe Chai". In various implementations, and as shown in FIG. 4A, each of these term hypotheses may be associated with a value generated in the ASR processing, such as probabilities of 0.55, 0.35, and 0.10, respectively (e.g., as shown in the table 420A of FIG. 4A), that are indicative of a likelihood of each of the term hypotheses corresponding to the portion of the spoken utterance 452A that corresponds to "Khe Chai".

Further assume that the automated assistant causes a given speech hypothesis 454A, from among the plurality of speech hypotheses, to be visually rendered for presentation to the user, such as the given speech hypothesis 454A of "Tell keychain that I will miss the meeting". Notably, a portion of the given speech hypothesis 454A includes an ASR misrecognition (e.g., "keychain" instead of "Khe Chai" as the user intended). Accordingly, further assume that the user provides further user interface input (e.g., as indicated by cursors 456A) that corrects the ASR misrecognition to an alternate speech hypothesis of "Khe Chai" (and optionally in respect to a user selection of the edit interface element 462). This further user interface input corresponds to a correction that is directed to an ASR misrecognition (e.g., and optionally determined using various techniques, such as based on edit distance between "keychain" instead of "Khe Chai", based on phonetic similarity between "keychain" instead of "Khe Chai", and/or based on other techniques). As a result, the automated assistant may store, in the on-device storage of the client device 410 and in association with a corresponding TTL in the on-device storage, the portion of the given speech hypothesis 454A (e.g., "keychain"), the alternate speech hypothesis (e.g., "Khe Chai"), and the audio data that captures the spoken utterance 452A. This enables the automated assistant to subsequently personalize the on-device ASR model to the user (e.g., as described with respect to the method 300 of FIG. 3) to mitigate future occurrences of this ASR misrecognition and until the corresponding TTL stored in association with this correction lapses. However, when the corresponding TTL stored in association with this correction lapses, the ASR processing may be subject to the same ASR misrecognition. To prevent the ASR processing from being subject to the same ASR misrecognition, techniques described herein propose generation and utilization of pseudo-corrections to subsequently personalize the on-device ASR model to the user.

For example, and referring specifically to FIG. 4B, assume that the user of the client device 410 provides a spoken utterance 452B of "What did Khe Chai think about the meeting?" at a second time instance of the plurality of time instances (e.g., as indicated by T2) that is subsequent to the first time instance. In this example, additional audio data that captures the spoken utterance 452B can be generated by one or more microphones of the client device 410. In some implementations, the automated assistant can cause the audio data to be processed using an on-device ASR model stored in on-device storage of the client device 410 (e.g., stored in the ML model(s) database 110A from FIG. 1) and that was personalized based on the correction from FIG. 4A. In processing the audio data using the on-device ASR model, the automated assistant can generate a plurality of speech hypotheses that are predicted to correspond to the spoken utterance 452B. The plurality of speech hypotheses may include term hypotheses and/or transcription hypotheses, such as term hypotheses of "Khe Chai", "keychain", and "key why" (e.g., as shown in table 420B1) for a portion of the spoken utterance 452B that corresponds to "Khe Chai". In some versions of these implementations, and as shown in FIG. 4B, each of these term hypotheses may be associated with a value generated in the ASR processing, such as probabilities of 0.65, 0.30, and 0.05, respectively (e.g., as shown in the table 420B1 of FIG. 4B), that are indicative of a likelihood of each of the term hypotheses corresponding to the portion of the spoken utterance 452B that corresponds to "Khe Chai". Put another way, the system may bias the ASR processing of the audio data towards "Khe Chai" and/or away from "keychain" based on the correction from FIG. 4A.

Further assume that the automated assistant causes a given speech hypothesis 454B, from among the plurality of speech hypotheses, to be visually rendered for presentation to the user, such as the given speech hypothesis 454B of "What did Khe Chai think about the meeting". Notably, a portion of the given speech hypothesis 454B includes "Khe Chai", which likely would have been an ASR misrecognition, but for the on-device ASR model being previously personalized to the user of the client device 410 based on the correction from FIG. 4A. Accordingly, and even though the given speech hypothesis 454B does not include an ASR misrecognition, the automated assistant may still generate a pseudo-correction based on the fact that the user would have provided further user interface input to correct an ASR misrecognition, but for the on-device ASR model being previously personalized to the user of the client device 410 based on the correction from FIG. 4A.

For instance, in these implementations, the automated assistant may generate the pseudo-correction based on co-occurrence of the "Khe Chai" and "keychain" being included in the plurality of speech hypotheses for the portion of the spoken utterance 452B that corresponds to "Khe Chai". In this instance, "keychain" corresponds to the portion of the given speech hypothesis from the correction from FIG. 4A and "Khe Chai" correspond to the alternative speech hypothesis from the correction from FIG. 4A. As a result, the automated assistant may store, in the on-device storage of the client device 410 and in association with a corresponding additional TTL in the on-device storage, the portion of the given speech hypothesis 454B (e.g., "Khe Chai"), the alternate speech hypothesis (e.g., "keychain"), and the audio data that captures the spoken utterance 452B. This enables the automated assistant to subsequently personalize the on-device ASR model to the user (e.g., as described with respect to the method 300 of FIG. 3) to continue mitigating future occurrences of this ASR misrecognition and until the corresponding additional TTL stored in association with this pseudo-correction lapses.

In additional or alternative implementations, the automated assistant can cause the audio data to be processed using a baseline instance of an on-device ASR model stored in on-device storage of the client device 410 (e.g., stored in the ML model(s) database 110A from FIG. 1) and that was not personalized based on the correction from FIG. 4A. In processing the audio data using the baseline instance of the on-device ASR model, the automated assistant can generate a plurality of baseline speech hypotheses that are predicted to correspond to the spoken utterance 452B. Further, the automated assistant can cause the audio data to be processed using a personalized instance of the on-device ASR model stored in the on-device storage of the client device 410 (e.g., stored in the ML model(s) database 110A from FIG. 1) and that was personalized based on the correction from FIG. 4A. In processing the audio data using the personalized instance of the on-device ASR model, the automated assistant can generate a plurality of personalized speech hypotheses that are predicted to correspond to the spoken utterance 452B. For instance, and as shown in table 420B2 in FIG. 4B, a given baseline speech hypothesis, from among the plurality of baseline speech hypotheses, generated using the baseline instance of the on-device ASR model may correspond to "What did keychain think about the meeting?", whereas a given personalized speech hypothesis, from among the plurality of personalized speech hypotheses, generated using the personalized instance of the on-device ASR model may correspond to "What did Khe Chai think about the meeting?".

In some versions of these implementations, each of the plurality of baseline speech hypotheses may be associated with corresponding baseline values generated in processing the audio data that captures the spoken utterance 452B and using the baseline instance of the on-device ASR model, and the given baseline speech hypothesis may be selected based on the corresponding baseline values. Similarly, each of the plurality of personalized speech hypotheses may be associated with corresponding personalized values generated in processing the audio data that captures the spoken utterance 452B and using the personalized instance of the on-device ASR model, and the given personalized speech hypothesis may be selected based on the corresponding personalized values.

Further assume that the automated assistant causes a given speech hypothesis 454B (e.g., the given personalized speech hypothesis) to be visually rendered for presentation to the user, such as the given speech hypothesis 454B of "What did Khe Chai think about the meeting". Similar to the above implementations, a portion of the given speech hypothesis 454B includes "Khe Chai", which likely would have been an ASR misrecognition, but for the personalized instance of the on-device ASR model being previously personalized to the user of the client device 410 based on the correction from FIG. 4A. Accordingly, and even though the given speech hypothesis 454B does not include an ASR misrecognition, the automated assistant may still generate a pseudo-correction based on the fact that the user would have provided further user interface input to correct an ASR misrecognition, but for the on-device ASR model being previously personalized to the user of the client device 410 based on the correction from FIG. 4A. Notably, the given baseline speech hypothesis is not provided for presentation to the user and may only be utilized to determine whether to generate the pseudo-correction.

For instance, in these implementations, the automated assistant may generate the pseudo-correction based on an aligned difference between the given baseline speech hypothesis including the portion of the given speech hypothesis that was previously corrected from FIG. 4A (e.g., "keychain") and based on the given personalized speech hypothesis including the alternate speech hypothesis from FIG. 4A (e.g., "Khe Chai"). Notably, this difference may be considered an aligned difference since these speech hypotheses include different interpretations for the same portion of audio data that captures the spoken utterance 452B. As a result, the automated assistant may store, in the on-device storage of the client device 410 and in association with a corresponding additional TTL in the on-device storage, the portion of the given speech hypothesis 454B (e.g., "Khe Chai"), the alternate speech hypothesis (e.g., "keychain"), and the audio data that captures the spoken utterance 452B. This enables the automated assistant to subsequently personalize the on-device ASR model to the user (e.g., as described with respect to the method 300 of FIG. 3) to continue mitigating future occurrences of this ASR misrecognition and until the corresponding additional TTL stored in association with this pseudo-correction lapses.

Notably, since the pseudo-correction was generated in FIG. 4B subsequent to the correction in FIG. 4A, the on-device ASR model will refrain from forgetting "Khe Chai" for a longer duration of time absent utilization of the pseudo-correction in subsequently personalizing the on-device ASR model to the user. Put another way, as long as the user of the client device 410 continues providing spoken utterances that include the previously corrected ASR misrecognition, the automated assistant can continue generating these pseudo-corrections to continue mitigating future occurrences of this ASR misrecognition. Notably, in various implementations, the automated assistant may only generate the pseudo-correction based on co-occurrence of the "Khe Chai" and "keychain" being included in the plurality of speech hypotheses. This prevents the automated assistant from generating pseudo-corrections in scenarios that the user would not have provided any correction.

For example, and referring specifically to FIG. 4C, assume that the user of the client device 410 provides a spoken utterance 452C of "Do they have any tea chai?" at a third time instance of the plurality of time instances (e.g., as indicated by T3) that is subsequent to the first time instance. In this example, additional audio data that captures the spoken utterance 452C can be generated by one or more microphones of the client device 410. In some implementations, the automated assistant can cause the audio data to be processed using an on-device ASR model stored in on-device storage of the client device 410 (e.g., stored in the ML model(s) database 110A from FIG. 1) and that was personalized based on the correction from FIG. 4A. In processing the audio data using the on-device ASR model, the automated assistant can generate a plurality of speech hypotheses that are predicted to correspond to the spoken utterance 452C. The plurality of speech hypotheses may include term hypotheses and/or transcription hypotheses, such as term hypotheses of "tea chai", "Khe Chai", and "key why" (e.g., as shown in table 420C1) for a portion of the spoken utterance 452C that corresponds to "tea chai". In some versions of these implementations, and as shown in FIG. 4C, each of these term hypotheses may be associated with a value generated in the ASR processing, such as probabilities of 0.65, 0.30, and 0.05, respectively (e.g., as shown in the table 420C1 of FIG. 4C), that are indicative of a likelihood of each of the term hypotheses corresponding to the portion of the spoken utterance 452B that corresponds to "tea chai".

Further assume that the automated assistant causes a given speech hypothesis 454C, from among the plurality of speech hypotheses, to be visually rendered for presentation to the user, such as the given speech hypothesis 454C of "Do they have any tea chai?". Notably, a portion of the given speech hypothesis 454C includes "tea chai", and an alternate speech hypothesis of "Khe Chai", which was previously learned by the on-device ASR model from being previously personalized to the user of the client device 410 based on the correction from FIG. 4A. However, in the example of FIG. 4C, the plurality of speech hypotheses do not include the portion of the given speech hypothesis from the correction from FIG. 4A (e.g., "keychain"). Accordingly, and even though the plurality of speech hypotheses do include the alternate speech hypothesis of "Khe Chai" from the correction of FIG. 4A, the automated assistant may refrain from generating a pseudo-correction since the user would not have provided further user interface input to correct an ASR misrecognition. Put another way, in the example of FIG. 4C, the portion of the given speech hypothesis 454C includes "tea chai" was not influenced by the correction from FIG. 4A, and, as a result, the automated assistant will refrain from generating any pseudo-correction. Notably, in the example of FIG. 4C, had the user provided further user interface input to correct "tea chai" to "Khe Chai", then the automated assistant may generate a correction in the same or similar manner described with respect to FIG. 4A (and subsequently generate pseudo-corrections based thereon in the same or similar manner described with respect to FIG. 4B).

In additional or alternative implementations, the automated assistant can cause the audio data to be processed using a baseline instance of an on-device ASR model stored in on-device storage of the client device 410 (e.g., stored in the ML model(s) database 110A from FIG. 1) and that was not personalized based on the correction from FIG. 4A. In processing the audio data using the baseline instance of the on-device ASR model, the automated assistant can generate a plurality of baseline speech hypotheses that are predicted to correspond to the spoken utterance 452C. Further, the automated assistant can cause the audio data to be processed using a personalized instance of the on-device ASR model stored in the on-device storage of the client device 410 (e.g., stored in the ML model(s) database 110A from FIG. 1) and that was personalized based on the correction from FIG. 4A. In processing the audio data using the personalized instance of the on-device ASR model, the automated assistant can generate a plurality of personalized speech hypotheses that are predicted to correspond to the spoken utterance 452C. For instance, and as shown in table 420C2 in FIG. 4C, a given baseline speech hypothesis, from among the plurality of baseline speech hypotheses, generated using the baseline instance of the on-device ASR model may correspond to "Do they have any tea chai?", whereas a given personalized speech hypothesis, from among the plurality of personalized speech hypotheses, generated using the personalized instance of the on-device ASR model may also correspond to "Do they have any tea chai?". In some versions of these implementations, each of the plurality of baseline speech hypotheses may be associated with the corresponding baseline values, and each of the plurality of personalized speech hypotheses may be associated with the corresponding personalized values to aid the automated assistant in the selection of the given baseline speech hypothesis and in the selection of the given personalized speech hypothesis in the same or similar manner described above with respect to FIG. 4B.

Notably, in these implementations, both the given baseline speech hypothesis and the given personalized speech hypothesis both include "tea chai" in the example of FIG. 4C. Accordingly, in the example of FIG. 4C, there is no aligned difference between the given baseline speech hypothesis and the given personalized speech hypothesis that corresponds to the correction from FIG. 4A. As a result, the automated assistant may refrain from generating a pseudo-correction since the user would not have provided further user interface input to correct an ASR misrecognition. Put another way, in the example of FIG. 4C, the portion of the given speech hypothesis 454C includes "tea chai" was not influenced by the correction from FIG. 4A, and, as a result, the automated assistant will refrain from generating any pseudo-correction, which, in these implementations, is determined based on there being no aligned difference between the given baseline speech hypothesis and the given personalized speech hypothesis.

Although FIGS. 4A-4C are described with respect to particular corrections and/or pseudo-corrections being generated, it should be understood that those particular corrections and/or pseudo-corrections are provided to illustrate various techniques contemplated herein and are not meant to be limiting. Rather, it should be understood that many of the techniques described herein are adapted based on various user interactions to personalize the on-device ASR model based on the various user interactions.

Figure 5:
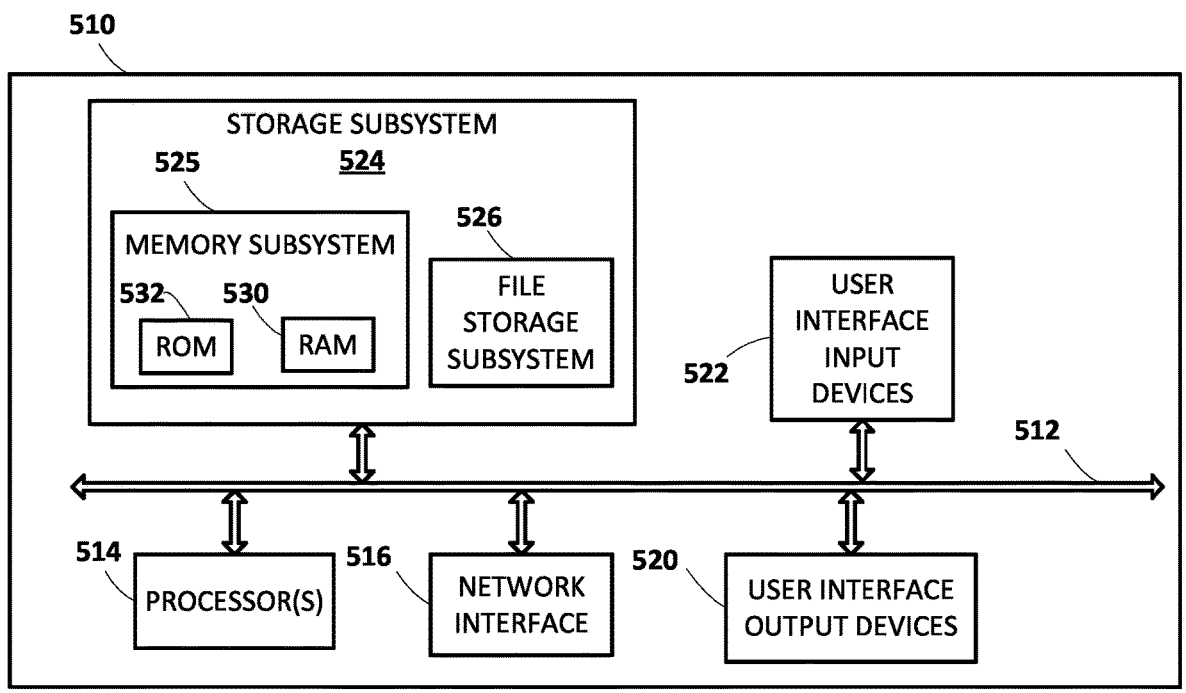
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided herein, and includes receiving, via one or more microphones of the client device, audio data that captures a spoken utterance of a user of the client device; processing, using an on-device automatic speech recognition (ASR) model that is stored locally in on-device storage of the client device, the audio data to generate a plurality of speech hypotheses that are each predicted to correspond to the spoken utterance; causing a given speech hypothesis, from among the plurality of speech hypotheses, to be visually rendered for presentation to the user at a display of the client device; receiving, responsive to the given speech hypothesis being visually rendered, further user interface input that modifies at least a portion of the given speech hypothesis to an alternate speech hypothesis; and in response to receiving the further user interface input: storing, in the on-device storage of the client device and in association with a given time to live (TTL) in the on-device storage of the client device, at least the portion of the given speech hypothesis and the alternate speech hypothesis as a correction for the on-device ASR model; and causing the on-device ASR model to be updated based on at least the correction. The method further includes receiving, via one or more of the microphones of the client device, additional audio data that captures an additional spoken utterance of the user; processing, using the on-device ASR model, the additional audio data to generate a plurality of additional speech hypotheses that are each predicted to correspond to the additional spoken utterance; and in response to determining that the plurality of additional speech hypotheses include at least the portion of the given speech hypothesis and the alternate speech hypothesis from the correction: storing, in the on-device storage of the client device and in association with an additional given TTL in the on-device storage of the client device, at least the portion of the given speech hypothesis and the alternate speech hypothesis as a pseudo-correction for the on-device ASR model; and causing the on-device ASR model to be updated based on at least the pseudo-correction.

These and other implementations of the technology can include one or more of the following features.

In some implementations, the method may further include, in response to determining that the given TTL stored in association with the correction has not lapsed, causing the on-device ASR model to be updated based on both the correction and the pseudo-correction. In some versions of those implementations, the method may further include, in response to determining that the given TTL stored in association with the correction has lapsed, causing the correction to be purged from the on-device storage of the client device. In some further versions of those implementations, causing the on-device ASR model to be updated may be based on only the pseudo-correction but not the correction.

In some implementations, the method may further include, in response to determining that the additional given TTL stored in association with the pseudo-correction has lapsed, causing the pseudo-correction to be purged from the on-device storage of the client device.

In some implementations, the method may further include storing, in the on-device storage of the client device and in association with the correction, the audio data. In some versions of those implementations, causing the on-device ASR model to be updated based on at least the correction may include processing, using the on-device ASR model, the audio data to generate a plurality of training speech hypotheses that are each predicted to correspond to the spoken utterance; utilizing the alternate speech hypothesis as a supervision signal to generate one or more losses for the on-device ASR model; and causing the on-device ASR model to be updated based on the one or more losses.

In some implementations, the method may further include storing, in the on-device storage of the client device and in association with the pseudo-correction, the additional audio data. In some versions of those implementations, causing the on-device ASR model to be updated based on at least the pseudo-correction may include processing, using the on-device ASR model, the additional audio data to generate a plurality of training speech hypotheses that are each predicted to correspond to the additional spoken utterance; utilizing the alternate speech hypothesis as a supervision signal to generate one or more losses for the on-device ASR model; and causing the on-device ASR model to be updated based on the one or more losses.

In some implementations, causing the on-device ASR model to be updated based on at least the correction and/or based on the at least one pseudo-correction may cause the on-device ASR model to bias subsequent ASR processing towards the alternate speech hypothesis. In additional or alternative implementations, causing the on-device ASR model to be updated based on at least the correction and/or based on the at least one pseudo-correction may cause the on-device ASR model to bias subsequent ASR processing away from the given speech hypothesis.

In some implementations, the method may further include, in response to determining that the plurality of additional speech hypotheses do not include at least the portion of the given speech hypothesis and the alternate speech hypothesis from the correction: refraining from storing, in the on-device storage of the client device, the pseudo-correction for the on-device ASR model.

In some implementations, causing the on-device ASR model to be updated may be in response to determining that one or more training conditions are satisfied. In some versions of those implementations, the one or more training conditions may include one or more of: a time of day, a day of week, whether the client device is charging, whether the client device has a threshold state of charge, or whether the client device is being held by the user.

In some implementations, the given speech hypothesis may be visually rendered for presentation to the user at the display of the client device as a transcription, and the further user interface input may be touch input directed to the transcription to modify the portion of the given speech hypothesis to the alternate speech hypothesis.

In some implementations, the further user interface input may be a further additional spoken utterance to modify the portion of the given speech hypothesis to the alternate speech hypothesis.

In some implementations, the plurality of speech hypotheses generated based on processing the audio data may not include the alternate speech hypothesis. In some versions of those implementations, the plurality of additional speech hypotheses generated based on processing the additional audio data may include the alternate speech hypothesis.

In some implementations, and in response to determining that the plurality of additional speech hypotheses include at least the portion of the given speech hypothesis and the alternate speech hypothesis from the correction, the method may further include causing the correction to be purged from the on-device storage of the client device.

In some implementations, the method may further include selecting the given speech hypothesis, from among the plurality of speech hypotheses, to be visually rendered for presentation to the user at the display of the client device based on values generated using the on-device ASR model in processing the audio data that captures the spoken utterance of the user.

In some implementations a method implemented by one or more processors of a client device is provided, and includes obtaining, from on-device storage of the client device, an on-device automatic speech recognition (ASR) model that is local to the client device; and obtaining, from the on-device storage of the client device, one or more pseudo-corrections, each of the one or more pseudo-corrections being associated with a corresponding time to live (TTL) in the on-device storage of the client device that has not lapsed, each of the one or more pseudo-corrections being associated with a corresponding portion of a given speech hypothesis and a corresponding alternate speech hypothesis from a corresponding previously generated correction, and each of the one or more pseudo-corrections being associated with corresponding audio data that was previously processed to generate the corresponding portion of the given speech hypothesis. The method further includes causing the on-device ASR model to be updated based on the one or more pseudo-corrections. Causing the on-device ASR model to be updated based on a given pseudo-correction, of the one or more pseudo-corrections, includes processing, using the on-device ASR model, the corresponding audio data to generate a plurality of training speech hypotheses that are each predicted to correspond to a corresponding spoken utterance captured in the corresponding audio data; utilizing the corresponding alternate speech hypothesis as a corresponding supervision signal to generate one or more corresponding losses for the on-device ASR model; and causing the on-device ASR model to be updated based on the one or more corresponding losses.

These and other implementations of the technology can include one or more of the following features.

In some implementations, each of the corresponding previously generated corrections may have been previously generated subsequent to a corresponding prior user interaction that corrected the corresponding portion of the given speech hypothesis to the corresponding alternate speech hypothesis.

In some versions of those implementations, the corresponding previously generated correction for the given pseudo-corrections may be associated with a corresponding TTL that has lapsed. In some further versions of those implementations, the method may further include refraining from causing the on-device ASR model to be updated based on the corresponding previously generated correction for the given pseudo-correction.

In additional or alternative versions of those implementations, the corresponding previously generated correction for the given pseudo-correction may be associated with a corresponding TTL that has not lapsed. In some further versions of those implementations, the method may further include further causing the on-device ASR model to be updated based on the corresponding previously generated correction for the given pseudo-correction.

In some implementations, causing the on-device ASR model to be updated based on the one or more pseudo-corrections may be in response to determining that one or more training conditions are satisfied. In some versions of those implementations, the one or more training conditions may include one or more of: a time of day, a day of week, whether the client device is charging, whether the client device has a threshold state of charge, or whether the client device is being held by the user. In additional or alternative versions of those implementations, obtaining the on-device ASR model that is local to the client device from the on-device storage of the client device may also be in response to determining that the one or more training conditions are satisfied, and obtaining the one or more pseudo-corrections from the on-device storage of the client device may also be in response to determining that the one or more training conditions are satisfied.

In some implementations, a method implemented by one or more processors of a client device is provided, and includes, at a first time instance of a plurality of time instances: receiving, via one or more microphones of the client device, audio data that captures a spoken utterance of a user of the client device; processing, using an on-device automatic speech recognition (ASR) model that is stored locally in on-device storage of the client device, the audio data to generate a plurality of speech hypotheses that are each predicted to correspond to the spoken utterance; causing a given speech hypothesis, from among the plurality of speech hypotheses, to be visually rendered for presentation to the user at a display of the client device; receiving, responsive to the given speech hypothesis being visually rendered, further user interface input that modifies at least a portion of the given speech hypothesis to an alternate speech hypothesis; and in response to receiving the further user interface input: storing, in the on-device storage of the client device and in association with a given time to live (TTL) in the on-device storage of the client device, at least the portion of the given speech hypothesis and the alternate speech hypothesis as a correction for the on-device ASR model. The method further includes, at a second time instance, of the plurality of time instances, that is subsequent to the first time instance: receiving, via one or more of the microphones of the client device, additional audio data that captures an additional spoken utterance of the user; processing, using the personalized instance of the on-device ASR model, the additional audio data to generate a plurality of additional speech hypotheses that are each predicted to correspond to the additional spoken utterance; and in response to determining that the plurality of additional speech hypotheses include at least the portion of the given speed hypothesis and the alternate speech hypothesis from the correction: storing, in the on-device storage of the client device and in association with an additional given TTL in the on-device storage of the client device, at least the portion of the given speech hypothesis and the alternate speech hypothesis as a pseudo-correction for the on-device ASR model. The method further includes, at a third time instance, of the plurality of time instances, that is subsequent to the first time instance and that is subsequent to the second time instance: in response to determining that the given TTL stored in association with the correction has not lapsed and in response to determining that the additional given TTL stored in association with the pseudo-correction has not lapsed: causing the on-device ASR model to be updated based on both the correction and the pseudo-correction; and in response to determining that the given TTL stored in association with the correction has lapsed and in response to determining that the additional given TTL stored in association with the pseudo-correction has not lapsed: causing the on-device ASR model to be updated based on the pseudo-correction but not the correction.

In some implementations, a method implemented by one or more processors of a client device is provided, and includes receiving, via one or more microphones of the client device, audio data that captures a spoken utterance of a user of the client device; processing, using a baseline instance of an on-device automatic speech recognition (ASR) model that is stored locally in on-device storage of the client device, the audio data to generate a plurality of speech hypotheses that are each predicted to correspond to the spoken utterance; causing a given speech hypothesis, from among the plurality of speech hypotheses, to be visually rendered for presentation to the user at a display of the client device; receiving, responsive to the given speech hypothesis being visually rendered, further user interface input that modifies at least a portion of the given speech hypothesis to an alternate speech hypothesis; and in response to receiving the further user interface input: storing, in the on-device storage of the client device and in association with a given time to live (TTL) in the on-device storage of the client device, at least the portion of the given speech hypothesis and the alternate speech hypothesis as a correction for the baseline instance of the on-device ASR model; causing the baseline instance of the on-device ASR model to be updated based on at least the correction to generate a personalized instance of the on-device ASR model; and storing, in the on-device storage of the client device and in addition to the baseline instance of the on-device ASR model, the personalized instance of the on-device ASR model. The method further includes receiving, via one or more of the microphones of the client device, additional audio data that captures an additional spoken utterance of the user; processing, using the baseline instance of the on-device ASR model, the additional audio data to generate a plurality of additional speech hypotheses that are each predicted to correspond to the additional spoken utterance; processing, using the personalized instance of the on-device ASR model, the additional audio data to generate a plurality of personalized speech hypotheses that are each predicted to correspond to the additional spoken utterance; determining, based on comparing one or more of the plurality of additional speech hypotheses that are each predicted to correspond to the additional spoken utterance to one or more of the plurality of personalized speech hypotheses that are each predicted to correspond to the additional spoken utterance, whether to generate a pseudo-correction that corresponds to the correction; and in response to determining to generate the pseudo-correction that corresponds to the correction: storing, in the on-device storage of the client device and in association with an additional given TTL in the on-device storage of the client device, at least the portion of the given speech hypothesis and the alternate speech hypothesis as a pseudo-correction for the baseline instance of on-device ASR model; causing the baseline instance of the on-device ASR model to be updated based on at least the pseudo-correction to generate an additional personalized instance of the on-device ASR model; and storing, in the on-device storage of the client device and in addition to the baseline instance of the on-device ASR model, the additional personalized instance of the on-device ASR model.

These and other implementations of the technology can include one or more of the following features.

In some implementations, the method further includes comparing a given additional speech hypothesis, from among the plurality of additional speech hypotheses, to a given personalized speech hypothesis, from among the plurality of personalized speech hypotheses, to determine whether to generate the pseudo-correction that corresponds to the correction.

In some versions of those implementations, the given additional speech hypothesis may be selected from among the plurality of additional speech hypotheses based on corresponding additional values generated using the baseline instance of the on-device ASR model in processing the additional audio data that captures the additional spoken utterance of the user. Further, the given personalized speech hypothesis may be selected from among the plurality of personalized speech hypotheses based on corresponding personalized values generated using the personalized instance of the on-device ASR model in processing the additional audio data that captures the additional spoken utterance of the user.

In additional or alternative versions of those implementations, the given additional speech hypothesis may include the portion of the given speech hypothesis that was modified by the further user interface input, and the given personalized speech hypothesis may include the alternate speech hypothesis from the further user interface input. In some further versions of those implementations, determining to generate the pseudo-correction that corresponds to the correction may be in response to determining that the given additional speech hypothesis includes the portion of the given speech hypothesis that was modified by the further user interface input and may be in response to determining that the given personalized speech hypothesis includes the alternate speech hypothesis from the further user interface input.

In some implementations, a method implemented by one or more processors of a client device is provided, and includes receiving, via one or more microphones of the client device, audio data that captures a spoken utterance of a user of the client device; processing, using a baseline instance of an on-device automatic speech recognition (ASR) model that is stored locally in on-device storage of the client device, the audio data to generate a plurality of baseline speech hypotheses that are each predicted to correspond to the spoken utterance; processing, using a personalized instance of the on-device ASR model that is in addition to the baseline instance of the on-device ASR model and that is also stored locally in the on-device storage of the client device, the audio data to generate a plurality of personalized speech hypotheses that are each predicted to correspond to the spoken utterance, wherein the personalized instance of the on-device ASR model was previously personalized locally at the client device based on a correction previously received from the user that was directed to previous ASR processing of previously received audio data; causing a given speech hypothesis, from among the plurality of baseline speech hypotheses and/or from among the plurality of personalized speech hypotheses, to be visually rendered for presentation to the user at a display of the client device; determining, based on comparing one or more of the plurality of baseline speech hypotheses that are each predicted to correspond to the spoken utterance to one or more of the plurality of personalized speech hypotheses that are each predicted to correspond to the spoken utterance, whether to generate a pseudo-correction that corresponds to the correction that was previously received from the user that was directed to the previous ASR processing of the previously received audio data; and in response to determining to generate the pseudo-correction that corresponds to the correction that was previously received from the user that was directed to the previous ASR processing of the previously received audio data: storing, in the on-device storage of the client device and in association with a given time to live (TTL) in the on-device storage of the client device, the pseudo-correction; causing the baseline instance of the on-device ASR model to be updated based on at least the pseudo-correction to generate an additional personalized instance of the on-device ASR model; and storing, in the on-device storage of the client device and in addition to the baseline instance of the on-device ASR model, the additional personalized instance of the on-device ASR model.

In some implementations, a method implemented by one or more processors of a client device is provided, and includes receiving, via one or more microphones of the client device, audio data that captures a spoken utterance of a user of the client device; determining, based on on-device automatic speech recognition (ASR) processing of the audio data using one or more ASR models stored locally in on-device storage of the client device, whether to generate a pseudo-correction that is to be subsequently utilized in updating one or more of the ASR models and that is to be generated based on a prior actual correction made by the user of the client device directed to prior on-device ASR processing; and in response to determining to generate the pseudo-correction: storing, in the on-device storage of the client device and in association with a pseudo-correction time to live (TTL) in the on-device storage of the client device for the pseudo-correction that lapses subsequent to a correction TTL in the on-device storage of the client device for the prior actual correction, at least a portion of a given speech hypothesis and an alternate speech hypothesis generated based on the on-device ASR processing as the pseudo-correction for one or more of the on-device ASR models; and storing, in the on-device storage of the client device and in association with the pseudo-correction, the audio data that captures the spoken utterance; and causing one or more of the on-device ASR models to be updated based on at least the pseudo-correction.

These and other implementations of the technology can include one or more of the following features.

In some implementations, determining whether to generate to the pseudo-correction may include processing, using a baseline instance of the on-device ASR model from among the one or more on-device ASR models and that was not previously personalized based on the prior actual correction, the audio data to generate a plurality of baseline speech hypotheses; processing, using a personalized instance of the on-device ASR model from among the one or more ASR models and that was previously personalized based on the prior actual correction, the audio data to generate a plurality of personalized speech hypotheses; and determining, based on comparing one or more of the plurality of baseline speech hypotheses to one or more of the plurality of personalized speech hypotheses, whether to generate the pseudo-correction.

In some versions of those implementations, determining to generate the pseudo-correction may include determining a given baseline speech hypothesis, from among the plurality of baseline speech hypotheses, includes the portion of the given speech hypothesis; and determining a given personalized speech hypothesis, from among the plurality of personalized speech hypotheses, includes the alternate speech hypothesis.

In some further versions of those implementations, the prior actual correction made by the user of the client device directed to the prior on-device ASR processing may be based on prior user interface input that modified the portion of the given speech hypothesis to the alternate speech hypothesis.

In some implementations, wherein determining whether to generate to the pseudo-correction may include processing, using a personalized instance of the on-device ASR model from among the one or more ASR models and that was previously personalized based on the prior actual correction, the audio data to generate a plurality of personalized speech hypotheses; and determining, based on whether the plurality of personalized speech hypotheses including the portion of the given speech hypothesis and the alternate speech hypothesis, whether to generate the pseudo-correction.

In some versions of those implementations, determining to generate the pseudo-correction may be in response to determining the plurality of personalized speech hypotheses include the portion of the given speech hypothesis and may be in response to determining that the plurality of personalized speech hypothesis include the alternate speech hypothesis.

In some further versions of those implementations, the prior actual correction made by the user of the client device directed to the prior on-device ASR processing may be based on prior user interface input that modified the portion of the given speech hypothesis to the alternate speech hypothesis.

In some implementations, causing one or more of the on-device ASR models to be updated based on at least the pseudo-correction may include processing, using a baseline instance of the on-device ASR model from among the one or more ASR models, the audio data to generate a plurality of training speech hypotheses that are each predicted to correspond to the spoken utterance; utilizing the alternate speech hypothesis as a supervision signal to generate one or more losses for the baseline instance of the on-device ASR model; and causing the baselines instance of the on-device ASR model to be updated based on the one or more losses to generate a personalized instance of the on-device ASR model.

In some implementations, the method may further include receiving, via one or more of the microphones of the client device, prior audio data that captures a prior spoken utterance of the user of the client device; processing, using a baseline instance of the on-device ASR model and from among the one or more ASR models, the prior audio data to generate a plurality of speech hypotheses that are each predicted to correspond to the prior spoken utterance; causing a given speech hypothesis, from among the plurality of speech hypotheses, to be visually rendered for presentation to the user at a display of the client device; receiving, responsive to the given speech hypothesis being visually rendered, prior further user interface input that modifies at least the portion of the given speech hypothesis to the alternate speech hypothesis; and in response to receiving the prior further user interface input: storing, in the on-device storage of the client device and in association with the correction TTL in the on-device storage of the client device, at least the portion of the given speech hypothesis and the alternate speech hypothesis as the prior actual correction; storing, in the on-device storage of the client device and in association with the prior actual correction, the prior audio data that captures the prior spoken utterance; and causing one or more of the on-device ASR models to be updated based on at least the prior actual correction.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a client device, the method comprising:
receiving, via one or more microphones of the client device, audio data that captures a spoken utterance of a user of the client device;
determining, based on on-device automatic speech recognition (ASR) processing of the audio data using one or more ASR models stored locally in on-device storage of the client device, whether to generate a pseudo-correction that is to be subsequently utilized in updating one or more of the ASR models and that is to be generated based on a prior actual correction made by the user of the client device directed to prior on-device ASR processing; and in response to determining to generate the pseudo-correction:
  storing, in the on-device storage of the client device and in association with a pseudo-correction time to live (TTL) in the on-device storage of the client device for the pseudo-correction that lapses subsequent to a correction TTL in the on-device storage of the client device for the prior actual correction, at least a portion of a given speech hypothesis and an alternate speech hypothesis generated based on the on-device ASR processing as the pseudo-correction for one or more of the on-device ASR models; and
  storing, in the on-device storage of the client device and in association with the pseudo-correction, the audio data that captures the spoken utterance; and
  causing one or more of the on-device ASR models to be updated based on at least the pseudo-correction.

2. The method of claim 1, wherein determining whether to generate to the pseudo-correction comprises:
  processing, using a baseline instance of the on-device ASR model from among the one or more on-device ASR models and that was not previously personalized based on the prior actual correction, the audio data to generate a plurality of baseline speech hypotheses;
  processing, using a personalized instance of the on-device ASR model from among the one or more ASR models and that was previously personalized based on the prior actual correction, the audio data to generate a plurality of personalized speech hypotheses; and
  determining, based on comparing one or more of the plurality of baseline speech hypotheses to one or more of the plurality of personalized speech hypotheses, whether to generate the pseudo-correction.

3. The method of claim 2, wherein determining to generate the pseudo-correction comprises:
  determining a given baseline speech hypothesis, from among the plurality of baseline speech hypotheses, includes the portion of the given speech hypothesis; and
  determining a given personalized speech hypothesis, from among the plurality of personalized speech hypotheses, includes the alternate speech hypothesis.

4. The method of claim 3, wherein the prior actual correction made by the user of the client device directed to the prior on-device ASR processing is based on prior user interface input that modified the portion of the given speech hypothesis to the alternate speech hypothesis.

5. The method of claim 1, wherein determining whether to generate to the pseudo-correction comprises:
  processing, using a personalized instance of the on-device ASR model from among the one or more ASR models and that was previously personalized based on the prior actual correction, the audio data to generate a plurality of personalized speech hypotheses; and
  determining, based on whether the plurality of personalized speech hypotheses including the portion of the given speech hypothesis and the alternate speech hypothesis, whether to generate the pseudo-correction.

6. The method of claim 5, wherein determining to generate the pseudo-correction is in response to determining the plurality of personalized speech hypotheses include the portion of the given speech hypothesis and in response to determining that the plurality of personalized speech hypothesis include the alternate speech hypothesis.

7. The method of claim 6, wherein the prior actual correction made by the user of the client device directed to the prior on-device ASR processing is based on prior user interface input that modified the portion of the given speech hypothesis to the alternate speech hypothesis.

8. The method of claim 1, wherein causing one or more of the on-device ASR models to be updated based on at least the pseudo-correction comprises:
  processing, using a baseline instance of the on-device ASR model from among the one or more ASR models, the audio data to generate a plurality of training speech hypotheses that are each predicted to correspond to the spoken utterance;
  utilizing the alternate speech hypothesis as a supervision signal to generate one or more losses for the baseline instance of the on-device ASR model; and
  causing the baselines instance of the on-device ASR model to be updated based on the one or more losses to generate a personalized instance of the on-device ASR model.

9. The method of claim 1, further comprising:
  receiving, via one or more of the microphones of the client device, prior audio data that captures a prior spoken utterance of the user of the client device;
  processing, using a baseline instance of the on-device ASR model and from among the one or more ASR models, the prior audio data to generate a plurality of speech hypotheses that are each predicted to correspond to the prior spoken utterance;
  causing a given speech hypothesis, from among the plurality of speech hypotheses, to be visually rendered for presentation to the user at a display of the client device;
  receiving, responsive to the given speech hypothesis being visually rendered, prior further user interface input that modifies at least the portion of the given speech hypothesis to the alternate speech hypothesis; and
  in response to receiving the prior further user interface input:
    storing, in the on-device storage of the client device and in association with the correction TTL in the on-device storage of the client device, at least the portion of the given speech hypothesis and the alternate speech hypothesis as the prior actual correction;
    storing, in the on-device storage of the client device and in association with the prior actual correction, the prior audio data that captures the prior spoken utterance; and
    causing one or more of the on-device ASR models to be updated based on at least the prior actual correction.

10. A method implemented by one or more processors of a client device, the method comprising:
  receiving, via one or more microphones of the client device, audio data that captures a spoken utterance of a user of the client device;
  processing, using a baseline instance of an on-device automatic speech recognition (ASR) model that is stored locally in on-device storage of the client device, the audio data to generate a plurality of speech hypotheses that are each predicted to correspond to the spoken utterance;
  causing a given speech hypothesis, from among the plurality of speech hypotheses, to be visually rendered for presentation to the user at a display of the client device;
  receiving, responsive to the given speech hypothesis being visually rendered, further user interface input that modifies at least a portion of the given speech hypothesis to an alternate speech hypothesis;
in response to receiving the further user interface input:
   storing, in the on-device storage of the client device and in association with a given time to live (TTL) in the on-device storage of the client device, at least the portion of the given speech hypothesis and the alternate speech hypothesis as a correction for the baseline instance of the on-device ASR model;
   causing the baseline instance of the on-device ASR model to be updated based on at least the correction to generate a personalized instance of the on-device ASR model; and
   storing, in the on-device storage of the client device and in addition to the baseline instance of the on-device ASR model, the personalized instance of the on-device ASR model;
receiving, via one or more of the microphones of the client device, additional audio data that captures an additional spoken utterance of the user;
processing, using the baseline instance of the on-device ASR model, the additional audio data to generate a plurality of additional speech hypotheses that are each predicted to correspond to the additional spoken utterance;
processing, using the personalized instance of the on-device ASR model, the additional audio data to generate a plurality of personalized speech hypotheses that are each predicted to correspond to the additional spoken utterance;
determining, based on comparing one or more of the plurality of additional speech hypotheses that are each predicted to correspond to the additional spoken utterance to one or more of the plurality of personalized speech hypotheses that are each predicted to correspond to the additional spoken utterance, whether to generate a pseudo-correction that corresponds to the correction; and
in response to determining to generate the pseudo-correction that corresponds to the correction:
   storing, in the on-device storage of the client device and in association with an additional given TTL in the on-device storage of the client device, at least the portion of the given speech hypothesis and the alternate speech hypothesis as a pseudo-correction for the baseline instance of on-device ASR model;
   causing the baseline instance of the on-device ASR model to be updated based on at least the pseudo-correction to generate an additional personalized instance of the on-device ASR model; and
   storing, in the on-device storage of the client device and in addition to the baseline instance of the on-device ASR model, the additional personalized instance of the on-device ASR model.

11. The method of claim 10, further comprising:
comparing a given additional speech hypothesis, from among the plurality of additional speech hypotheses, to a given personalized speech hypothesis, from among the plurality of personalized speech hypotheses, to determine whether to generate the pseudo-correction that corresponds to the correction.

12. The method of claim 11, wherein the given additional speech hypothesis is selected from among the plurality of additional speech hypotheses based on corresponding additional values generated using the baseline instance of the on-device ASR model in processing the additional audio data that captures the additional spoken utterance of the user, and wherein the given personalized speech hypothesis is selected from among the plurality of personalized speech hypotheses based on corresponding personalized values generated using the personalized instance of the on-device ASR model in processing the additional audio data that captures the additional spoken utterance of the user.

13. The method of claim 11, wherein the given additional speech hypothesis includes the portion of the given speech hypothesis that was modified by the further user interface input, and wherein the given personalized speech hypothesis includes the alternate speech hypothesis from the further user interface input.

14. The method of claim 13, wherein determining to generate the pseudo-correction that corresponds to the correction is in response to determining that the given additional speech hypothesis includes the portion of the given speech hypothesis that was modified by the further user interface input and in response to determining that the given personalized speech hypothesis includes the alternate speech hypothesis from the further user interface input.

15. A method implemented by one or more processors of a client device, the method comprising:
receiving, via one or more microphones of the client device, audio data that captures a spoken utterance of a user of the client device;
processing, using an on-device automatic speech recognition (ASR) model that is stored locally in on-device storage of the client device, the audio data to generate a plurality of speech hypotheses that are each predicted to correspond to the spoken utterance;
causing a given speech hypothesis, from among the plurality of speech hypotheses, to be visually rendered for presentation to the user at a display of the client device;
receiving, responsive to the given speech hypothesis being visually rendered, further user interface input that modifies at least a portion of the given speech hypothesis to an alternate speech hypothesis;
in response to receiving the further user interface input:
   storing, in the on-device storage of the client device and in association with a given time to live (TTL) in the on-device storage of the client device, at least the portion of the given speech hypothesis and the alternate speech hypothesis as a correction for the on-device ASR model; and
   causing the on-device ASR model to be updated based on at least the correction;
receiving, via one or more of the microphones of the client device, additional audio data that captures an additional spoken utterance of the user;
processing, using the on-device ASR model, the additional audio data to generate a plurality of additional speech hypotheses that are each predicted to correspond to the additional spoken utterance; and
in response to determining that the plurality of additional speech hypotheses include at least the portion of the given speech hypothesis and the alternate speech hypothesis from the correction:
   storing, in the on-device storage of the client device and in association with an additional given TTL in the on-device storage of the client device, at least the portion of the given speech hypothesis and the alternate speech hypothesis as a pseudo-correction for the on-device ASR model; and
   causing the on-device ASR model to be updated based on at least the pseudo-correction.

16. The method of claim 15, further comprising:
in response to determining that the given TTL stored in association with the correction has not lapsed, causing the on-device ASR model to be updated based on both the correction and the pseudo-correction.

17. The method of claim 16, further comprising:
in response to determining that the given TTL stored in association with the correction has lapsed, causing the correction to be purged from the on-device storage of the client device.

18. The method of claim 17, wherein causing the on-device ASR model to be updated is based on only the pseudo-correction but not the correction.

19. The method of claim 15, further comprising:
in response to determining that the additional given TTL stored in association with the pseudo-correction has lapsed, causing the pseudo-correction to be purged from the on-device storage of the client device.

20. The method of claim 15,
wherein causing the on-device ASR model to be updated based on at least the correction and/or based on the at least one pseudo-correction causes the on-device ASR model to bias subsequent ASR processing towards the alternate speech hypothesis, and/or
wherein causing the on-device ASR model to be updated based on at least the correction and/or based on the at least one pseudo-correction causes the on-device ASR model to bias subsequent ASR processing away from the given speech hypothesis.

* * * * *